(12) United States Patent
Sugimoto et al.

(10) Patent No.: US 9,639,016 B2
(45) Date of Patent: May 2, 2017

(54) TONER, DEVELOPER, IMAGE FORMING APPARATUS, AND PROCESS CARTRIDGE

(71) Applicants: Tsuyoshi Sugimoto, Shizuoka (JP); Shinya Nakayama, Shizuoka (JP); Hiroshi Yamada, Shizuoka (JP); Hideyuki Santo, Kanagawa (JP); Shin Hasegawa, Tokyo (JP); Suzuka Karato, Shizuoka (JP); Kohsuke Nagata, Shizuoka (JP); Koh Ohnuma, Shizuoka (JP)

(72) Inventors: Tsuyoshi Sugimoto, Shizuoka (JP); Shinya Nakayama, Shizuoka (JP); Hiroshi Yamada, Shizuoka (JP); Hideyuki Santo, Kanagawa (JP); Shin Hasegawa, Tokyo (JP); Suzuka Karato, Shizuoka (JP); Kohsuke Nagata, Shizuoka (JP); Koh Ohnuma, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/051,195

(22) Filed: Feb. 23, 2016

(65) Prior Publication Data
US 2016/0259257 A1    Sep. 8, 2016

(30) Foreign Application Priority Data

Mar. 6, 2015    (JP) .................................. 2015-044784

(51) Int. Cl.
| | |
|---|---|
| G03G 9/08 | (2006.01) |
| G03G 9/087 | (2006.01) |
| C08G 18/75 | (2006.01) |
| C08G 18/42 | (2006.01) |
| C08L 67/00 | (2006.01) |

(52) U.S. Cl.
CPC ...... *G03G 9/08755* (2013.01); *C08G 18/4219* (2013.01); *C08G 18/4247* (2013.01); *C08G 18/755* (2013.01); *C08L 67/00* (2013.01)

(58) Field of Classification Search
CPC .................................................. G03G 9/08755
USPC ..................................................... 430/109.4
See application file for complete search history.

(56) References Cited

U.S. PATENT DOCUMENTS

| | | |
|---|---|---|
| 2013/0059247 A1 | 3/2013 | Sugimoto et al. |
| 2014/0270874 A1 | 9/2014 | Hase et al. |

FOREIGN PATENT DOCUMENTS

| | | |
|---|---|---|
| JP | 63-109447 | 5/1988 |
| JP | 11-133665 | 5/1999 |
| JP | 2001-158819 | 6/2001 |

(Continued)

*Primary Examiner* — Mark A Chapman
(74) *Attorney, Agent, or Firm* — Oblon, McClelland, Maier & Neustadt, L.L.P.

(57) ABSTRACT

A toner includes a polyester resin including a polyester resin component A (A) insoluble in tetrahydrofuran; and a polyester resin component B (B) soluble in tetrahydrofuran. The toner has a first glass transition temperature (Tg1st) of from 20° C. to 50° C., measured at a first temperature rising in differential scanning calorimetry (DSC), and satisfies the following formulae (1) and (2):

$T=1/\{a/(TgA+273)+b/(TgB+273)\}-273$ (1)

$T-TgAB>30\times a$ (2)

wherein a and b represent weight ratios of (A) and (B) to a total weight of (A) and (B), and satisfy the equation a+b=1; and TgA, TgB and TgAB represent second glass transition temperatures (Tg2nd), measured at a second temperature rising in differential scanning calorimetry, of (A), (B), and a mixture of (A) and (B), respectively.

11 Claims, 2 Drawing Sheets

(56) References Cited

FOREIGN PATENT DOCUMENTS

| | | |
|---|---|---|
| JP | 2002-287400 | 10/2002 |
| JP | 2002-351143 | 12/2002 |
| JP | 2004-046095 | 2/2004 |
| JP | 2007-271789 | 10/2007 |
| JP | 2013-054178 | 3/2013 |
| JP | 2014-199420 | 10/2014 |

TONER, DEVELOPER, IMAGE FORMING APPARATUS, AND PROCESS CARTRIDGE

CROSS-REFERENCE TO RELATED APPLICATIONS

This patent application is based on and claims priority pursuant to 35 U.S.C. §119 to Japanese Patent Application No. 2015-044784, filed on Mar. 6, 2015, in the Japan Patent Office, the entire disclosure of which is hereby incorporated by reference herein.

BACKGROUND

Technical Field

The present invention relates to a toner, a developer, an image forming apparatus and a process cartridge.

Description of the Related Art

In recent years, toners have been required to have smaller particle diameters and hot offset resistance for increasing quality of output images, to have low-temperature fixability for energy saving, and to have heat resistant preservability for the toners to be resistant to high-temperature, high-humidity conditions during storage and transportation after production. In particular, improvement in low-temperature fixability is very important because power consumption in fixing occupies much of power consumption in an image forming step.

Conventionally, toners produced by the kneading pulverizing method have been used. In the toners produced by the kneading pulverizing method, is difficulty encountered in making them have smaller particle diameters, and their shapes are indefinite and their particle size distribution is broad, for which these toners have the following problems, for example: the quality of output images is not sufficient; and the fixing energy required is high. Also, when wax (release agent) has been added for improving fixability, the toners produced by the kneading pulverizing method are cracked at the interfaces with the wax upon pulverization, so that much of the wax is disadvantageously present on the toner surface. As a result, although releasing effects can be obtained, deposition (filming) of the toners on carriers, photoconductors, and blades will easily occur. Thus, their entire performances have not been satisfactory, which is problematic.

Then, in order to overcome the above problems accompanied by the kneading pulverizing method, toner production methods based on the polymerization method have been proposed. Toners produced by the polymerization method are easily allowed to have smaller particle diameters, and their particle size distribution is sharper than that of the toners produced by the pulverization method and moreover it is possible to enclose a release agent.

SUMMARY

A toner includes a polyester resin including a polyester resin component A (A) insoluble in tetrahydrofuran; and a polyester resin component B (B) soluble in tetrahydrofuran. The toner has a first glass transition temperature (Tg1st) of from 20° C. to 50° C., measured at a first temperature rising in differential scanning calorimetry (DSC), and satisfies the following formulae (1) and (2):

$$T = 1/\{a/(TgA+273) + b/(TgB+273)\} - 273 \quad (1)$$

$$T - TgAB > 30 \times a \quad (2)$$

wherein a and b represent weight ratios of (A) and (B) to a total weight of (A) and (B), and satisfy the equation a+b=1; and TgA, TgB and TgAB represent second glass transition temperatures (Tg2nd), measured at a second temperature rising in differential scanning calorimetry, of (A), (B), and a mixture of (A) and (B), respectively.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
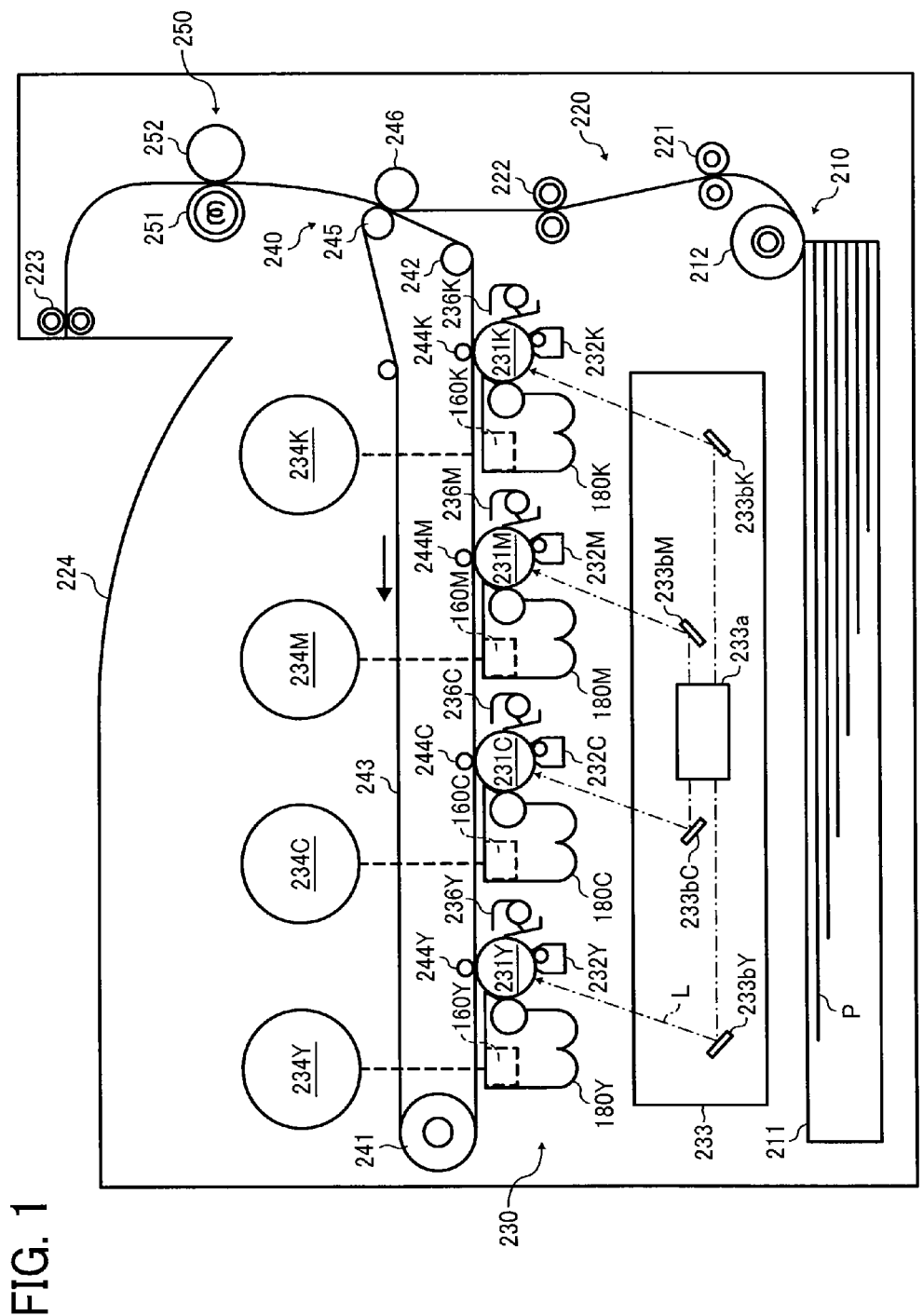
FIG. 1 is a schematic view illustrating an embodiment of the image forming apparatus of the present invention.
Figure 2:
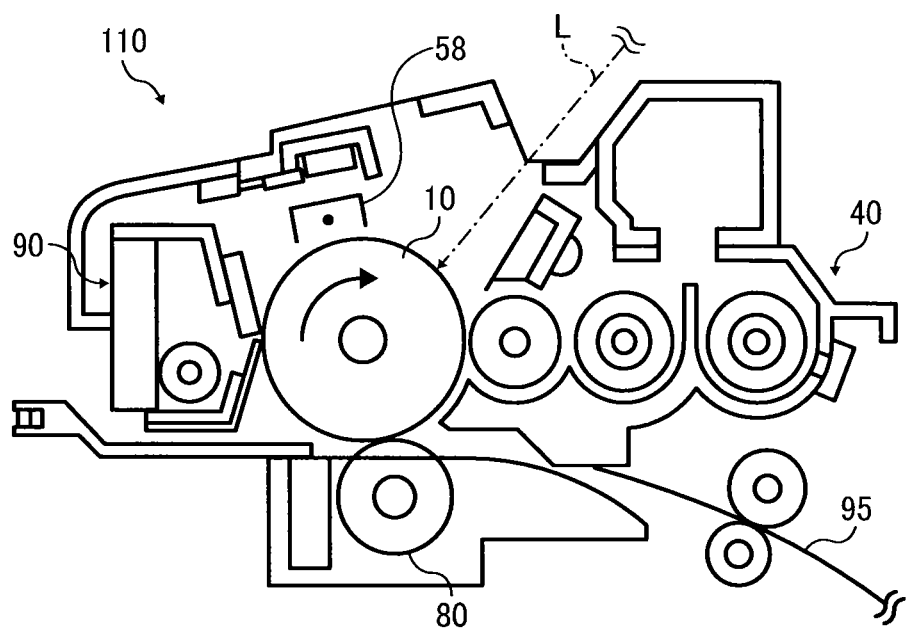
FIG. 2 is a schematic view illustrating an embodiment of the process cartridge of the present invention.

An object of the present invention is to provide a toner having good low-temperature fixability, high temperature offset resistance, heat resistant preservability and stable chargeability, and producing images having high glossiness.

Another object of the present invention is to provide a developer using the toner.

A further object of the present invention is to provide an image forming apparatus using the toner.

Another object of the present invention is to provide a process cartridge using the toner.

The present invention provides a toner having good low-temperature fixability, high temperature offset resistance, heat resistant preservability and stable chargeability, and producing images having high glossiness.

(Toner)

The toner of the present invention has a glass transition temperature at a first temperature rising (Tg1st) of from 20° C. to 50° C. in differential scanning calorimetry (DSC), and includes at least a polyester resin component A insoluble in THF and a polyester resin component B soluble in THF.

In addition, the toner satisfies the following formulae (1) and (2):

$$T = 1/\{a/(TgA+273) + b/(TgB+273)\} - 273 \quad (1)$$

$$T - TgAB > 30 \times a \quad (2)$$

wherein a represents a weight ratio of a component A representing a component of the polyester resin insoluble in THF to a total weight of the component A and a component B representing a component thereof soluble in THF; b represents a weight ratio of the component B to a total weight thereof; a+b=1; and TgA, TgB and TgAB represent glass transition temperatures at a second temperature rising (Tg2nd) in differential scanning calorimetry of the component A, the component B and a mixture thereof, respectively.

A polyester resin is obtained by polymerizing polyols, polycarboxylic acids, polycarboxylic acid anhydride and polycarboxylic acid components such as polycarboxylic acid esters. The polyester resin includes an amorphous polyester resin and a crystalline polyester resin. The crystalline polyester resin melts faster than the amorphous polyester resin, and is blended therewith to improve low-temperature fixability.

In order to further improve the low-temperature fixability of a toner, as the amorphous polyester resin is melted with a crystalline polyester resin together, a method of lowering a glass transition temperature or a method of decreasing a molecular weight is thought. However, when the glass transition temperature of the amorphous polyester resin is simply lowered or the molecular weight thereof is simply decreased to lower melt viscosity, it is easily conceivable that the toner deteriorates in heat resistant preservability and hot offset resistance when fixed.

A polyester resin component A insoluble in tetrahydrofuran (THF) in the present invention mostly comes from an amorphous polyester resin having a large molecular weight. A polyester resin component soluble in tetrahydrofuran (THF) in the present invention mostly comes from an amorphous polyester resin having a small molecular weight and a crystalline polyester resin. The polyester resin component A insoluble in tetrahydrofuran (THF) in the toner of the present invention lowers a glass transition temperature (Tg) and melt viscosity. Having low-temperature fixability, the polyester resin component A has a branched structure in the molecular skeleton and the molecular chain has a three-dimensional network structure. Therefore, the polyester resin component A is deformed but not fluidized like a rubber, and the toner keeps heat resistant preservability and hot offset resistance.

However, when a polyester resin component B soluble in THF is randomly selected for the polyester resin component A, the toner deteriorates in chargeability. After the polyester resin component A and the polyester resin component B are mixed, the TgAB of the second heating in differential scanning calorimetry satisfying the relations of the formulae (1) and (2) suppresses deterioration of chargeability.

When compatibility between the polyester resin components A and B is insufficient, the polyester resin component A is deformable at low temperature and a polymer chain thereof present near the surface of a toner freely behaves, resulting in escape of charges on the surface of a toner and insufficient charge retainability.

Further, when compatibility between the polyester resin components A and B is improved, they uniformly melt at lower temperature to improve low-temperature fixability of the toner. In addition, a polymer chain of the polyester resin component A bound by the polyester resin component B is thought to improve heat resistant preservability of the toner.

The following Fox formula (3) (T. G. Fox, Bull. Am. Physics Soc., vol. 1, No. 3, page 123 (1956) is typically known as a formula of determining a glass transition temperature when plural polymer copolymers are compatible with each other:

$$1/Tg = \Sigma(Wn/Tgn) \quad (3)$$

wherein Tgn represents an absolute glass transition temperature of a sole polymer of each component; and Wn represents a weight fraction of each component.

When the TgAB of a mixture of the polyester resin components A and B at the second heating in differential scanning calorimetry and T represented by the following formula (1) showing a value expected by Fox formula satisfy the relation represented by the formula (2), the compatibility between the polyester resin components A and B is good to improve charge stability of the toner. a represents a weight ratio of the polyester resin component A to a total weight of the polyester resin component A and the polyester resin component B (a+b=1).

$$T = 1/\{a/(TgA+273) + b/(TgB+273)\} - 273 \quad (1)$$

$$T - TgAB > 30 \times a \quad (2)$$

<Polyester Resin Component A Insoluble in Tetrahydrofuran (THF)>

The polyester resin components A includes a polyol component and a polycarboxylic component. The polyol component includes a diol component. The diol component preferably includes an aliphatic diol having 3 to 10 carbon atoms in an amount not less than 50% by mol, and more preferably not less than 80% by mol.

Specific examples of the aliphatic diol having 3 to 10 carbon atoms include 1,2-propylene glycol, 1,3-propylene glycol, 1,4-butanediol, 2-methyl-1,3-propanediol, 1,5-pentanediol, 3-methyl-1,5-pentanediol, 1,6-hexanediol, 1,8-octanediol, 1,10-decanediol, 1,12-dodecanediol, etc.

The diol component of the polyester resin component A has a main chain having an odd number of carbon atoms and preferably has an alkyl group as a side chain. The aliphatic diol having 3 to 10 carbon atoms preferably has a structure represented by the following formula:

$$HO-(CR1R2)n-OH$$

wherein R1 and R2 independently represent a hydrogen atom or an alkyl group having 1 to 3 carbon atoms; and n represents an odd number of from 3 to 9.

The polyester resin component A preferably includes a crosslinkable component. The crosslinkable component is preferably a tri- or higher valent aliphatic alcohol, and more preferably a tri- to tetravalent aliphatic alcohol in terms of glossiness and density of fixed images. The crosslinkable component may be only the tri- or higher valent aliphatic alcohol. Specific examples of the tri- or higher aliphatic alcohol include, but are not limited to, glycerin, trimethylolethane, trimethylolpropane, pentaerythritol, sorbitol and dipentaerythritol. These tri- or higher aliphatic alcohols may be sued alone or in combination.

As the crosslinkable component of the polyester resin component A, a tri- or higher valent carboxylic acid or an epoxy compound can be used. However, the tri- or higher valent aliphatic alcohol is preferably used in terms of less unevenness, and sufficient glossiness and image density.

The polyester resin component A preferably includes the crosslinkable component in an amount of from 0.5% to 5% by weight, and more preferably from 1% to 3% by weight.

The polyol component in the polyester resin component A preferably includes the tri- or higher valent aliphatic alcohol in an amount of from 50% to 100% by weight, and more preferably from 90% to 100% by weight.

The polyester resin component A preferably includes an aliphatic dicarboxylic acid having 4 to 12 carbon atoms in an amount not less than 50% by mol.

Specific examples of the aliphatic dicarboxylic acid having 4 to 12 carbon atoms include succinic acid, glutaric acid, adipic acid, pimelic acid, suberic acid, azelaic acid, sebacic acid, dodecanedioic acid, etc.

The polyester resin component A preferably has a urethane bond and/or a urea bond to improve adhesiveness to a recording medium such as papers. Since the urethane bond and/or a urea bond behaves like a pseudo-crosslinked point, the polyester resin component A works more like a rubber, and the toner has better heat resistant preservability and hot offset resistance.

The glass transition temperature at a first temperature rising (Tg1st) of the toner of the present invention in DSC can be adjusted by changing a constitutional ratio of the aliphatic diol and the dicarboxylic acid component in the polyester resin component A, a glass transition temperature of the polyester resin component B, or a constitutional ratio of the polyester resin component A and the polyester resin component B.

A molecular weight of the polyester resin component A is not particularly limited and may be appropriately selected depending on the intended purpose. However, when the molecular weight thereof is too low, heat resistant preservability of the toner and durability against stress such as stirring in an image developer may be deteriorated. When the molecular weight thereof is too high, viscoelasticity of the toner during melting may be high, and thus low-temperature fixability of the toner may be deteriorated. Thus, a weight-average molecular weight (Mw) of the polyester resin A is preferably 30,000 to 100,000 as measured by GPC (gel permeation chromatography). A number-average molecular weight (Mn) thereof is preferably 5,000 to 20,000. Moreover, a Mw/Mn thereof is preferably 1.0 to 10.0.

<Polyester Resin Component B Soluble in Tetrahydrofuran (THF)>

The polyester resin component B includes a diol component and a dicarboxylic acid component as constitutional components, and includes at least alkylene glycol in an amount not less than 40% by mol.

The polyester resin component B may not include a crosslinkable component as a constitutional component.

The polyester resin component B preferably has a Tg of from 40° C. to 80° C.

The polyester resin component B is preferably a linear polyester resin.

In addition, the polyester resin component B is preferably an unmodified polyester resin. The unmodified polyester resin is obtained by using a polyol; and a polycarboxylic acid such as a polycarboxylic acid, a polycarboxylic acid anhydride and a polycarboxylic acid ester or its derivatives, and is not modified by an isocyanate compound.

Examples of the polyol include diols.

Specific examples of the diols include alkylene (having 2 to 3 carbon atoms) oxide (average addition molar number is 1 to 10) adduct of bisphenol A such as polyoxypropylene(2. 2)-2, 2-bis(4-hydroxyphenyl)propane, and polyoxyethylene (2. 2)-2, 2-bis(4-hydroxyphenyl)propane; ethyleneglycol, propyleneglycol; and hydrogenated bisphenol A, and alkylene (having 2 to 3 carbon atoms) oxide (average addition molar number is 1 to 10) adduct of hydrogenated bisphenol A.

These may be used alone or in combination.

Examples of the polycarboxylic acid include dicarboxylic acid. Specific examples of the dicarboxylic acid include: adipic acid, phthalic acid, isophthalic acid, terephthalic acid, fumaric acid, maleic acid; and succinic acid substituted by an alkyl group having 1 to 20 carbon atoms or an alkenyl group having 2 to 20 carbon atoms such as dodecenylsuccinic acid and octylsuccinic acid. Particularly, the polyester resin component B preferably includes terephthalic acid in an amount not less than 50% by mol.

These may be used alone or in combination.

The polyester resin component B may include a tri- or higher valent carboxylic acid and/or a tri- or higher valent alcohol at the end of the resin chain to adjust an acid value and a hydroxyl value.

Specific examples of the tri- or higher valent carboxylic acid include trimellitic acid, pyromellitic acid, their acid anhydrides, etc.

Specific examples of the tri- or higher valent alcohol include glycerin, pentaerythritol, trimethylol propane, etc.

A molecular weight of the polyester resin component B is not particularly limited and may be appropriately selected depending on the intended purpose. However, when the molecular weight thereof is too low, heat resistant preservability of the toner and durability against stress such as stirring in an image developer may be deteriorated. When the molecular weight thereof is too high, viscoelasticity of the toner during melting may be high, and thus low-temperature fixability of the toner may be deteriorated. When components having a molecular weight not greater than 600 are too many, heat resistant preservability of the toner and durability against stress such as stirring in an image developer may be deteriorated. When components having a molecular weight not greater than 600 are too few, low-temperature fixability of the toner may be deteriorated. Thus, a weight-average molecular weight (Mw) of the polyester resin A is preferably 3,000 to 10,000 as measured by GPC (gel permeation chromatography). A number-average molecular weight (Mn) thereof is preferably 1,000 to 4,000. Moreover, a Mw/Mn thereof is preferably 1.0 to 4.0.

The polyester resin component B preferably includes a THF-soluble component having a molecular weight not greater than 600 in an amount of from 2% to 10% by weight. The polyester resin component B may be abstracted with methanol and a component having a molecular weight not greater than 600 may be removed therefrom, and refined. A weight-average molecular weight (Mw) thereof is preferably 4,000 to 7,000. A number-average molecular weight (Mn) thereof is preferably 1,500 to 3,000. Moreover, a Mw/Mn thereof is preferably 1.0 to 3.5.

The polyester resin component B preferably has an acid value of from 1 mg KOH/g to 50 mg KOH/g, and more preferably 5 mg KOH/g to 30 mg KOH/g. When the acid value thereof is not less than 1 mg KOH/g, the resultant toner may be negatively charged. In addition, the resultant toner has good affinity between paper and the toner when fixed on the paper, and thus low-temperature fixability of the toner may be improved. Meanwhile, when the acid value is greater than 50 mg KOH/g, the resultant toner may be deteriorated in charging stability, especially charging stability against environmental change.

A hydroxyl value of the polyester resin component B is not particularly limited and may be appropriately selected depending on the intended purpose. The hydroxyl value thereof is preferably mot less than 5 mg KOH/g.

A glass transition temperature (Tg) of the polyester resin component B is preferably from 40° C. to 80° C., more preferably from 50° C. to 70° C. When the glass transition temperature thereof is less than 40° C., the resultant toner may be deteriorated in heat resistant preservability and durability against stress such as stirring in the developing unit, and the resultant toner may be deteriorated in filming resistance. Meanwhile, when the glass transition temperature thereof is greater than 80° C., the deformation of the toner with heat and pressurization during fixing may be not sufficient, which leads to insufficient low-temperature fixability.

The content of the polyester resin component B is preferably from 50 parts by weight to 90 parts by weight, more preferably from 60 parts by weight to 80 parts by weight, relative to 100 parts by weight of the toner. When the amount thereof is less than 50 parts by weight, dispersibility of the colorant and the release agent in the toner may be deteriorated, and fogging and artifacting of an image may be caused. When it is greater than 90 parts by weight, the content of the crystalline polyester resin or the polyester resin component A is lower, and thus the toner may be deteriorated in low-temperature fixability. The content thereof falling within the more preferable range is advantageous in that the toner is excellent in both high image and low-temperature fixability.

—Polyester Resin Having a Urethane Bond and/or a Urea Bond—

Specific examples of the polyester resin having a urethane bond and/or a urea bond include, but are not limited to, reactants between a polyester resin having an active hydrogen group and polyisocyanate. The reactant is preferably used as a reaction precursor (hereinafter referred to as a "prepolymer") reacting with a curing agent mentioned later. Specific examples of the polyester resin having an active hydrogen group include a polyester resin having a hydroxyl group, etc.

—Polyisocyanate—

The polyisocyanate is not particularly limited and may be appropriately selected depending on the intended purpose. Examples thereof include diisocyanate, and tri- or higher valent isocyanate.

Examples of the diisocyanate include aliphatic diisocyanate; alicyclic diisocyanate; aromatic diisocyanate; aromatic aliphatic diisocyanate; isocyanurate; and a block product thereof where the foregoing compounds are blocked with a phenol derivative, oxime, or caprolactam.

Specific examples of the aliphatic diisocyanate include tetramethylene diisocyanate, hexamethylene diisocyanate, 2, 6-diisocyanato methyl caproate, octamethylene diisocyanate, decamethylene diisocyanate, dodecamethylene diisocyanate, tetradecamethylene diisocyanate, trimethylhexane diisocyanate, tetramethylhexane diisocyanate, etc.

Specific examples of the alicyclic diisocyanate include isophorone diisocyanate, cyclohexylmethane diisocyanate, etc.

Specific examples of the aromatic diisocyanate include tolylene diisocyanate, diisocyanato diphenyl methane, 1, 5-naphthylene diisocyanate, 4, 4'-diisocyanato diphenyl, 4, 4'-diisocyanato-3, 3'-dimethyldiphenyl, 4, 4'-diisocyanato-3-methyldiphenyl methane, 4, 4'-diisocyanato-diphenyl ether, etc.

Specific examples of the aromatic aliphatic diisocyanate include α, α, α', α'-tetramethylxylene diisocyanate, etc.

Specific examples of the isocyanurate include tris(isocyanatoalkyl)isocyanurate, tris(isocyanatocycloalkyl)isocyanurate, etc.

These polyisocyanates may be used alone or in combination.

—Curing Agent—

The curing agent is not particularly limited and may be appropriately selected depending on the intended purpose, so long as it can react with a prepolymer. Examples thereof include an active hydrogen group-containing compound.

—Active Hydrogen Group-Containing Compound—

An active hydrogen group in the active hydrogen group-containing compound is not particularly limited and may be appropriately selected depending on the intended purpose. Examples thereof include a hydroxyl group (e.g., an alcoholic hydroxyl group, and a phenolic hydroxyl group), an amino group, a carboxyl group, and a mercapto group. These may be used alone or in combination.

The active hydrogen group-containing compound is preferably amines, because it can form a urea bond.

Specific examples of the amines include diamine, trivalent or higher amine, amino alcohol, amino mercaptan, amino acid, compounds in which the amino groups of the foregoing compounds are blocked, etc. These may be used alone or in combination Among them, diamine, and a mixture of diamine and a small amount of tri- or higher valent amine are preferably used.

Specific examples of the diamine include aromatic diamine, alicyclic diamine, and aliphatic diamine, etc. Specific examples of the aromatic diamine include phenylenediamine, diethyl toluene diamine, 4, 4'-diaminodiphenylmethane, etc. Specific examples of the alicyclic diamine include 4, 4'-diamino-3, 3'-dimethyldicyclohexyl methane, diamino cyclohexane, isophoronediamine, etc. Specific examples of the aliphatic diamine include ethylene diamine, tetramethylene diamine, hexamethylenediamine, etc.

Specific examples of the tri- or higher valent amine include diethylenetriamine, triethylene tetramine, etc.

Specific examples of the amino alcohol include ethanol amine, hydroxyethyl aniline, etc.

Specific examples of the amino mercaptan include aminoethyl mercaptan, aminopropyl mercaptan, etc.

Specific examples of the amino acid include amino propionic acid, amino caproic acid, etc.

Specific examples of the compound where the amino group is blocked include a ketimine compound where the amino group is blocked with ketone such as acetone, methyl ethyl ketone, methyl isobutyl ketone, an oxazoline compound, etc.

A molecular structure of the polyester resin components A or B can be confirmed by solution-state or solid-state NMR, X-ray diffraction, GC/MS, LC/MS, or IR spectroscopy. Simple methods for confirming the molecular structure thereof include a method for detecting, as the polyester resin, one that does not have absorption based on δCH (out-of-plane bending vibration) of olefin at 965 $cm^{-1}\pm10$ $cm^{-1}$ and 990 $cm^{-1}\pm10$ $cm^{-1}$ in an infrared absorption spectrum.

Specific methods of improving compatibility between the polyester resin components A and B include the followings:

Decreasing a difference of SP (solubility parameter) values between the polyester resin components A and B;

Introducing a monomer having a skeleton similar to that of each of the polyester resin components A and B;

Decreasing a difference of molecular weight between the polyester resin components A and B; and Forming a branch structure similar to that of the polyester resin component A in the polyester resin component B.

The above methods are combined to design a molecular structure of each of the polyester resin components A and B, and the compatibility between the polyester resin components A and B is determined on the basis of the formulae (1) and (2).

<Crystalline Polyester Resin>

The crystalline polyester resin which is a material for the polyester resin component B imparting low-temperature fixability to the toner of the present invention.

The crystalline polyester resin exhibits heat melting characteristics where it causes drastic viscosity lowering at temperature around fixing onset temperature, since it has high crystallinity. By using the crystalline polyester resin having these characteristics together with the polyester resin, the heat resistant preservability of the toner is excellent up to the melt onset temperature owing to crystallinity, and the toner drastically decreases its viscosity at the melt onset temperature because of melting of the crystalline polyester resin. Along with the drastic decrease in viscosity, the crystalline polyester resin melts together with the polyester resin, to drastically decrease their viscosity to thereby be fixed. Accordingly, a toner having excellent heat resistant preservability and low-temperature fixability can be obtained. Moreover, the toner has excellent results in terms of a releasing width (a difference between the minimum fixing temperature and hot offset occurring temperature).

When the crystalline polyester is combined with an amorphous polyester, the crystalline polyester is included as a part of the THF-soluble polyester resin in the present invention.

The crystalline polyester resin is obtained from a polyhydric alcohol and a multivalent carboxylic acid or a derivative thereof such as a multivalent carboxylic acid anhydride and a multivalent carboxylic acid ester.

Note that, in the present invention, the crystalline polyester resin is one obtained by using a polyol, and a polycarboxylic acid or derivatives thereof such as a polycarboxylic acid, a polycarboxylic acid anhydride, and a polycarboxylic acid ester, as described above, and a product obtained by modifying a polyester resin (for example, the prepolymer, and a resin obtained through crosslinking and/or chain elongation reaction of the aforementioned prepolymer) do not belong to the crystalline polyester resin.

—Polyol—

The polyol is not particularly limited and may be appropriately selected depending on the intended purpose. Examples thereof include diol, and tri- or higher valent alcohol.

Specific examples of the diol include saturated aliphatic diol, etc. Specific examples of the saturated aliphatic diol include straight chain saturated aliphatic diol, and branched-chain saturated aliphatic diol. Among them, straight chain saturated aliphatic diol is preferably used, and straight chain saturated aliphatic diol having 2 to 12 carbon atoms is more preferably used. When the saturated aliphatic diol has a branched-chain structure, crystallinity of the crystalline polyester resin may be low, and thus may lower the melting point. When the number of carbon atoms in the saturated aliphatic diol is greater than 12, it may be difficult to yield a material in practice.

Specific examples of the saturated aliphatic diol include ethylene glycol, 1, 3-propanediol, 1, 4-butanediol, 1, 5-pentanediol, 1, 6-hexanediol, 1, 7-heptanediol, 1, 8-octanediol, 1, 9-nonanediol, 1, 10-decanediol, 1, 11-undecanediol, 1, 12-dodecanediol, 1, 13-tridecanediol, 1, 14-tetradecanediol, 1, 18-octadecanediol, 1, 14-eicosanedecanediol, etc. Among them, ethylene glycol, 1, 4-butanediol, 1, 6-hexanediol, 1, 8-octanediol, 1, 10-decanediol, and 1, 12-dodecanediol are preferably used, as they give high crystallinity to a resulting crystalline polyester resin, and give excellent sharp melt properties.

Specific examples of the tri- or higher valent alcohol include glycerin, trimethylol ethane, trimethylolpropane, pentaerythritol, etc. These may be used alone or in combination.

—Polycarboxylic Acid—

The multivalent carboxylic acid is not particularly limited and may be appropriately selected depending on the intended purpose. Examples thereof include divalent carboxylic acid, and tri- or higher valent carboxylic acid.

Specific examples of the divalent carboxylic acid include saturated aliphatic dicarboxylic acids such as an oxalic acid, a succinic acid, a glutaric acid, an adipic acid, a suberic acid, an azelaic acid, a sebacic acid, a 1, 9-nonanedicarboxylic acid, a 1, 10-decanedicarboxylic acid, a 1, 12-dodecanedicarboxylic acid, a 1, 14-tetradecanedicarboxylic acid, and a 1, 18-octadecanedicarboxylic acid; aromatic dicarboxylic acids of dibasic acid such as a phthalic acid, an isophthalic acid, a terephthalic acid, a naphthalene-2, 6-dicarboxylic acid, a malonic acid, a and mesaconic acid; and anhydrides of the foregoing compounds, and lower (having 1 to 3 carbon atoms) alkyl ester of the foregoing compounds.

Specific examples of the tri- or higher valent carboxylic acid include 1, 2, 4-benzenetricarboxylic acid, 1, 2, 5-benzenetricarboxylic acid, 1, 2, 4-naphthalene tricarboxylic acid, anhydrides thereof, and lower (having 1 to 3 carbon atoms) alkyl esters thereof.

Moreover, the polycarboxylic acid may contain, other than the saturated aliphatic dicarboxylic acid or aromatic dicarboxylic acid, dicarboxylic acid containing a sulfonic acid group.

Further, the polycarboxylic acid may contain, other than the saturated aliphatic dicarboxylic acid or aromatic dicarboxylic acid, dicarboxylic acid having a double bond.

These may be used alone or in combination.

The crystalline polyester resin is preferably composed of a straight chain saturated aliphatic dicarboxylic acid having 4 to 12 carbon atoms and a straight chain saturated aliphatic diol having 2 to 12 carbon atoms. As a result of this, crystallinity increases, and sharp melt properties improves, and therefore it is preferable as excellent low-temperature fixability of the toner is exhibited.

A melting point of the crystalline polyester resin is not particularly limited and may be appropriately selected depending on the intended purpose, but it is preferably 60° C. to 80° C. When the melting point thereof is less than 60° C., the crystalline polyester resin tends to melt at low temperature, which may impair heat resistant preservability of the toner. When the melting point thereof is greater than 80° C., melting of the crystalline polyester resin with heat applied during fixing may be insufficient, which may impair low-temperature fixability of the toner.

A molecular weight of the crystalline polyester resin is not particularly limited and may be appropriately selected depending on the intended purpose. Since those having a sharp molecular weight distribution and low molecular weight have excellent low-temperature fixability, and heat resistant preservability of the resultant toner lowers as an amount of a low molecular weight component, an o-dichlorobenzene soluble component of the crystalline polyester resin preferably has the weight-average molecular weight (Mw) of 3,000 to 30,000, number average molecular weight (Mn) of 1,000 to 10,000, and Mw/Mn of 1.0 to 10, as measured by GPC. Further, it is more preferred that the weight-average molecular weight (Mw) thereof be 5,000 to 15,000, the number average molecular weight (Mn) thereof be 2,000 to 10,000, and the Mw/Mn be 1.0 to 5.0.

An acid value of the crystalline polyester resin is not particularly limited and may be appropriately selected depending on the intended purpose, but it is preferably not less than 5 mg KOH/g, more preferably not less than 10 mg KOH/g for achieving the desired low-temperature fixability in view of affinity between paper and the resin. Meanwhile, the acid value thereof is preferably 45 mg KOH/g or lower for the purpose of improving hot offset resistance.

A hydroxyl value of the crystalline polyester resin is not particularly limited and may be appropriately selected depending on the intended purpose. However, it is preferably 0 mg KOH/g to 50 mg KOH/g, more preferably 5 mg KOH/g to 50 mg KOH/g, in order to achieve the desired low-temperature fixability and excellent charging property.

A molecular structure of the crystalline polyester resin can be confirmed by solution-state or solid-state NMR, X-ray diffraction, GC/MS, LC/MS, or IR spectroscopy. Simple methods for confirming the molecular structure thereof include a method for detecting, as a crystalline polyester resin, one that has absorption based on δCH (out-of-plane bending vibration) of olefin at 965 cm$^{-1}$±10 cm$^{-1}$ and 990 cm$^{-1}$±10 cm$^{-1}$ in an infrared absorption spectrum.

The content of the crystalline polyester resin is not particularly limited and may be appropriately selected depending on the intended purpose, but it is preferably 3 parts by weight to 20 parts by weight, more preferably 5 parts by weight to 15 parts by weight, relative to 100 parts by weight of the toner. When the amount thereof is less than 3 parts by weight, the crystalline polyester resin is insufficient in sharp melt property, and thus the resultant may be deteriorated in heat resistant preservability. When it is greater than 20 parts by weight, the resultant toner may be deteriorated in heat resistant preservability, and fogging of an image may be caused. When the amount thereof is within more preferable range than the aforementioned range, it is advantageous that the resultant toner is excellent in both high image quality and low-temperature fixability.

<Other Components>

Examples of the aforementioned other components include a release agent, a colorant, a charge controlling agent, an external additive, a fluidity improver, a cleanability improver, and a magnetic material.

—Release Agent—

The release agent is appropriately selected from those known in the art without any limitation.

Specific examples of wax serving as the release agent include natural wax such as vegetable wax (e.g., carnauba wax, cotton wax, Japan wax and rice wax), animal wax (e.g., bees wax and lanolin), mineral wax (e.g., ozokelite and ceresine) and petroleum wax (e.g., paraffin wax, microcrystalline wax and petrolatum).

Specific examples of the wax other than the above natural wax include a synthetic hydrocarbon wax (e.g., Fischer-Tropsch wax and polyethylene wax; and a synthetic wax (e.g., ester wax, ketone wax and ether wax).

Further, other examples of the release agent include fatty acid amides such as 12-hydroxystearic acid amide, stearic amide, phthalic anhydride imide and chlorinated hydrocarbons; low-molecular-weight crystalline polymers such as acrylic homopolymers (e.g., poly-n-stearyl methacrylate and poly-n-lauryl methacrylate) and acrylic copolymers (e.g., n-stearyl acrylate-ethyl methacrylate copolymers); and crystalline polymers having a long alkyl group as a side chain of the diol component.

Among them, a hydrocarbon wax such as a paraffin wax, a microcrystalline wax, a Fischer-Tropsch wax, a polyethylene wax, and a polypropylene wax is preferably used.

A melting point of the release agent is not particularly limited and may be appropriately selected depending on the intended purpose, but it is preferably 60° C. to 80° C. When the melting point thereof is less than 60° C., the release agent tends to melt at low temperature, which may impair heat resistant preservability. When the melting point thereof is greater than 80° C., the release agent does not sufficiently melt to thereby cause fixing offset, even in the case where the resin is in the fixing temperature range, which may cause defects in an image.

The content of the release agent is appropriately selected depending on the intended purpose without any limitation, but it is preferably 2 parts by weight to 10 parts by weight, more preferably 3 parts by weight to 8 parts by weight, relative to 100 parts by weight of the toner. When the amount thereof is less than 2 parts by weight, the resultant toner may have insufficient hot offset resistance, and low-temperature fixability during fixing. When the amount thereof is greater than 10 parts by weight, the resultant toner may have insufficient heat resistant preservability, and tends to cause fogging in an image. When the content thereof is within the aforementioned more preferable range, it is advantageous because image quality and fixing stability can be improved.

—Colorant—

The colorant is appropriately selected depending on the intended purpose without any limitation, and examples thereof include carbon black, a nigrosin dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazine lake, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRLL and F4RH), fast scarlet VD, vulcan fast rubin B, brilliant scarlet G, lithol rubin GX, permanent red FSR, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

The content of the colorant is not particularly limited and may be appropriately selected depending on the intended purpose, but it is preferably 1 part by weight to 15 parts by weight, more preferably 3 parts by weight to 10 parts by weight, relative to 100 parts by weight of the toner.

The colorant may be used as a master batch in which the colorant forms a composite with a resin. As a resin used in the production of the master batch or a resin kneaded together with the master batch, other than the another polyester resin, polymer of styrene or substitution thereof (e.g., polystyrene, poly-p-chlorostyrene, and polyvinyl toluene); styrene copolymer (e.g., styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer); and others including polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid resin, rosin, modified rosin, a terpene resin, an aliphatic or alicyclic hydrocarbon resin, an aromatic petroleum resin, chlorinated paraffin, and paraffin wax can be used.

These may be used alone or in combination.

The master batch can be prepared by mixing and kneading the colorant with the resin for the master batch. In the mixing and kneading, an organic solvent may be used for improving the interactions between the colorant and the resin. Moreover, the master batch can be prepared by a flashing method in which an aqueous paste containing a colorant is mixed and kneaded with a resin and an organic solvent, and then the colorant is transferred to the resin to remove the water and the organic solvent. This method is preferably used because a wet cake of the colorant is used as it is, and it is not necessary to dry the wet cake of the colorant to prepare a colorant. In the mixing and kneading of the colorant and the resin, a high-shearing disperser (e.g., a three-roll mill) is preferably used.

—Charge Controlling Agent—

The charge controlling agent is not particularly limited and may be appropriately selected depending on the intended purpose. Examples thereof include a nigrosine-based dye, a triphenylmethane-based dye, a chromium-containing metallic complex dye, a molybdic acid chelate pigment, a rhodamine-based dry, alkoxy-based amine, a quaternary ammonium salt (including a fluorine-modified quaternary ammonium salt), alkylamide, a simple substance or a compound of phosphorus, a simple substance or a compound of tungsten, a fluorine-based activator, a salicylic acid metallic salt, a metallic salt of salicylic acid derivative, etc.

Specific examples thereof include a nigrosine dye BONTRON 03, a quaternary ammonium salt BONTRON P-51, a metal-containing azo dye BONTRON S-34, an oxynaphthoic acid-based metal complex E-82, a salicylic acid-based metal complex E-84 and a phenol condensate E-89 (all products of ORIENT CHEMICAL INDUSTRIES CO., LTD.); quaternary ammonium salt molybdenum complexes TP-302 and TP-415 (all products of Hodogaya Chemical Co., Ltd.); LRA-901; a boron complex LR-147 (product of Japan Carlit Co., Ltd.); a copper phthalocyanine; perylene; quinacridone; an azo-pigment; and polymeric compounds having, as a functional group, a sulfonic acid group, carboxyl group, quaternary ammonium salt, etc.

The content of the charge controlling agent is not particularly limited and may be appropriately selected depending on the intended purpose, but it is preferably 0.1 parts by weight to 10 parts by weight, more preferably 0.2 parts by weight to 5 parts by weight, relative to 100 parts by weight of the toner. When the amount thereof is greater than 10 parts by weight, the charging ability of the toner becomes excessive, which may reduce the effect of the charge controlling agent, increase electrostatic force to a developing roller, leading to low flowability of the developer, or low image density of the resulting image. These charge controlling agents may be dissolved and dispersed after being melted and kneaded together with the master batch, and/or resin. The charge controlling agents can be, of course, directly added to an organic solvent when dissolution and dispersion is performed. Alternatively, the charge controlling agents may be fixed on surfaces of toner particles after the production of the toner particles.

—External Additive—

The external additive is not particularly limited and may be appropriately selected depending on the intended purpose. Examples thereof include inorganic particles and hydrophobized inorganic particles. Fatty acid metal salts (e.g., zinc stearate, and aluminum stearate), and a fluoropolymer can also be used.

Specific examples of the inorganic particles include silica, alumina, titanium oxide, barium titanate, magnesium titanate, calcium titanate, strontium titanate, iron oxide, copper oxide, zinc oxide, tin oxide, quartz sand, clay, mica, wollastonite, diatomaceous earth, chromic oxide, cerium oxide, red iron oxide, antimony trioxide, magnesium oxide, zirconium oxide, barium sulfate, barium carbonate, calcium carbonate, silicon carbide, and silicon nitride. Among them, silica and titanium dioxide are preferably used.

Examples of the suitable additive include hydrophobized silica, titania, titanium oxide, and alumina particles. Examples of the silica particles include R972, R974, RX200, RY200, R202, R805, and R812 (all products of Nippon Aerosil Co., Ltd.). Examples of the titania particles include P-25 (product of Nippon Aerosil Co., Ltd.); STT-30, STT-65C-S (both products of Titan Kogyo, Ltd.); TAF-140 (product of Fuji Titanium Industry Co., Ltd.); and MT-150W, MT-500B, MT-600B, MT-150A (all product of TAYCA CORPORATION).

Examples of the hydrophobized titanium oxide particles include: T-805 (product of Nippon Aerosil Co., Ltd.); STT-30A, STT-65S-S (both products of Titan Kogyo, Ltd.); TAF-500T, TAF-1500T (both products of Fuji Titanium Industry Co., Ltd.); MT-100S, MT-100T (both products of TAYCA CORPORATION); and IT-S (product of ISHIHARA SANGYO KAISHA, LTD.).

The hydrophobized oxide particles, hydrophobized silica particles, hydrophobized titania particles, and hydrophobized alumina particles can be obtained, for example, by treating hydrophilic particles with a silane coupling agent, such as methyltrimethoxy silane, methyltriethoxy silane, and octyltrimethoxy silane. Moreover, silicone oil-treated oxide particles, or silicone oil-treated inorganic particles, which have been treated by adding silicone oil optionally with heat, are also suitably used as the external additive.

Examples of the silicone oil include dimethyl silicone oil, methylphenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacryl-modified silicone oil, and α-methylstyrene-modified silicone oil.

The average particle diameter of primary particles of the inorganic particles is not particularly limited and may be appropriately selected depending on the intended purpose, but it is preferably not greater than 100 nm, more preferably from 3 nm to 70 nm. When the average particle diameter thereof is within the aforementioned range, the inorganic particles are embedded in the toner particles, and therefore the function of the inorganic particles may not be effectively exhibited. When it exceeds the aforementioned range, the inorganic particles may unevenly damage a surface of a photoconductor, and hence not preferable.

The average particle diameter of primary particles of the hydrophobized particles is preferably 1 nm to 100 nm, and more preferable 5 nm to 70 nm.

Moreover, it is preferred that the external additive contain at least one type of hydrophobized inorganic particles having the average particle diameter of primary particles not greater than 20 nm, and at least one type of inorganic particles having the average particle diameter of primary particles not less than 30 nm. Moreover, the external additive preferably has the BET specific surface area of 20 m²/g to 500 m²/g.

The content of the external additive is not particularly limited and may be appropriately selected depending on the intended purpose, but it is preferably 0.1 parts by weight to 5 parts by weight, more preferably 0.3 parts by weight to 3 parts by weight, relative to 100 parts by weight of the toner.

—Fluidity Improver—

The fluidity improver is not particularly limited and may be appropriately selected depending on the intended purpose so long as it is capable of performing surface treatment of the toner to increase hydrophobicity, and preventing degradations of flow properties and charging properties of the toner even in a high humidity environment. Examples thereof include a silane-coupling agent, a sililation agent, a silane-coupling agent containing a fluoroalkyl group, an organic titanate-based coupling agent, an aluminum-based coupling agent, silicone oil, and modified silicone oil. It is particularly preferred that the silica or the titanium oxide be used as hydrophobic silica or hydrophobic titanium oxide treated with the aforementioned flow improving agent.

—Cleanability Improver—

The cleanability improver is not particularly limited and may be appropriately selected depending on the intended purpose so long as it can be added to the toner for the purpose of removing the developer remaining on a photoconductor or a primary transfer member after transferring. Examples thereof include: fatty acid metal salt such as zinc stearate, calcium stearate, and stearic acid; and polymer particles produced by soap-free emulsion polymerization, such as polymethyl methacrylate particles, and polystyrene particles. The polymer particles are preferably those having a relatively narrow particle size distribution, and the polymer particles having the volume average particle diameter of 0.01 µm to 1 µm are preferably used.

—Magnetic Material—

The magnetic material is not particularly limited and may be appropriately selected depending on the intended purpose. Examples thereof include iron powder, magnetite, and ferrite. Among them, a white magnetic material is preferable in terms of a color tone.

<Glass Transition Temperature (Tg1st)>

A glass transition temperature (Tg1st) of the toner is preferably from 20° C. to 50° C., and more preferably from 25° C. to 50° C. where the glass transition temperature (Tg1st) is a glass transition temperature measured in first heating of differential scanning calorimetry (DSC) of the toner.

In conventional toners, when a Tg thereof is about not greater than 50° C., the conventional toners tend to cause aggregation of toner particles because it is influenced by temperature variations during transportation or storage of the toner in summer or in a tropical region. As a result, the toner particles are solidified in a toner bottle, or adherence of the toner particles may be caused within a developing unit. Moreover, supply failures due to clogging of the toner in the toner bottle, and formation of defected images due to adherence of the toner may be caused.

A toner of the present invention tends to have a lower Tg than the conventional toners. However, since the polyester resin component A which is a low Tg component in the toner is non-linear, the toner of the present invention can retain heat resistant preservability.

In particular, when the polyester resin component A has a urethane bond or a urea bond responsible for high aggregation force, the resultant toner may significantly exhibit more excellent effects in heat resistant preservability.

A glass transition temperature (Tg2nd) of the toner is preferably from 0° C. to 30° C., and more preferably from 10° C. to 30° C. where the glass transition temperature (Tg2nd) is a glass transition temperature measured in second heating of differential scanning calorimetry (DSC) of the toner.

A difference (Tg1st−Tg2nd) is not particularly limited and may be appropriately selected depending on the intended purpose, but it is preferably greater than 0° C., and more preferably not less than 10° C. An upper limit of the difference is not particularly limited and may be appropriately selected depending on the intended purpose, but the difference is preferably not greater than 50° C.

In the toner of the present invention, when including a crystalline polyester resin, the crystalline polyester resin and the polyester resin components A and B incompatible with each other before (first) heating are compatible with each other thereafter.

When the Tg1st is less than 20° C., the toner may be deteriorated in heat resistant preservability, and blocking within a developing unit and filming on a photoconductor may be caused. When the Tg1st is greater than 50° C., low-temperature fixability of the toner may be deteriorated.

When the Tg2nd is less than 0° C., the fixed image (printed matter) may deteriorate in anti-blocking within a developing unit. When greater than 30° C., the toner may not have sufficient low-temperature fixability and glossiness.

<Volume-Average Particle Diameter>

The volume-average particle diameter of the toner is not particularly limited and may be appropriately selected depending on the intended purpose, but it is preferably 3 µm to 7 µm. Moreover, a ratio of the volume average particle diameter to the number average particle diameter is preferably not greater than 1.2. Further, the toner preferably contains toner particles having the volume average particle diameter of 2 µm or less, in an amount of 1% by number to 10% by number.

<Calculation Methods and Analysis Methods of Various Properties of Toner and Constituent Component of Toner>

A SP value, a Tg, an acid value, a hydroxyl value, a molecular weight, and a melting point of the polyester resin, the crystalline polyester resin, and the release agent may be each measured. Alternatively, each component may be separated from an actual toner by gel permeation chromatography (GPC) or the like, and each of the separated components may be subjected to the analysis methods described hereinafter, to thereby determine physical properties such as a SP value, a Tg, a molecular weight, a melting point, and a weight ratio of constituent components.

Separation of each component by GPC can be performed, for example, by the following method.

In GPC measurement using THF (tetrahydrofuran) as a mobile phase, an eluate is subjected to fractionation by a fraction collector, a fraction corresponding to a part of a desired molecular weight is collected from a total area of an elution curve. The combined eluate is concentrated and dried by an evaporator or the like, and a resulting solid content is dissolved in a deuterated solvent, such as deuterated chloroform, and deuterated THF, followed by measurement of ¹H-NMR. From an integral ratio of each element, a ratio of a constituent monomer of the resin in the elution composition is calculated.

As another method, after concentrating the eluate, hydrolysis is performed with sodium hydroxide or the like, and a ratio of a constituent monomer is calculated by subjecting the decomposed product to a qualitative and quantitative analysis by high performance liquid chromatography (HPLC).

Note that, in the case where the toner is produced by generating the polyester resin through a chain-elongation reaction and/or crosslink reaction of the non-linear reactive precursor and the curing agent to thereby produce toner base particles, the polyester resin may be separated from an actual toner by GPC or the like, to thereby determine a Tg thereof. Alternatively, the toner may be produced by synthesizing the polyester resin through a chain-elongation reaction and/or crosslink reaction of the non-linear reactive precursor and the curing agent, to thereby measure a Tg thereof from the synthesized polyester resin.

<<Means for Separating Toner Constituent Components>>

One example of a separation unit for each component during an analysis of the toner will be specifically explained hereinafter.

First, 1 g of a toner is added to 100 mL THF, and the resulting mixture is stirred for 30 min at 25° C., to thereby obtain a solution in which soluble components are dissolved. The solution is then filtered through a membrane filter having an opening of 0.2 μm, to thereby obtain THF soluble matter in the toner. Next, the THF soluble matter are dissolved in THF, to thereby prepare a sample for measurement of GPC, and the prepared sample is supplied to GPC used for molecular weight measurement of each resin mentioned above.

Meanwhile, a fraction collector is disposed at an eluate outlet of GPC, to fraction the eluate per a certain count. The eluate is obtained per 5% in terms of the area ratio from the elution onset on the elution curve (raise of the curve).

Next, each eluted fraction, as a sample, in an amount of 30 mg is dissolved in 1 mL of deuterated chloroform, and to this solution, 0.05% by volume of tetramethyl silane (TMS) is added as a standard material. A glass tube for NMR having a diameter of 5 mm is charged with the solution, from which a spectrum is obtained by a nuclear magnetic resonance apparatus (JNM-AL 400, product of JEOL Ltd.) by performing multiplication 128 times at temperature of from 23° C. to 25° C.

The monomer compositions and the compositional ratios of the polyester resin and the crystalline polyester resin in the toner are determined from peak integral ratios of the obtained spectrum.

<<Means for Separating Polyester Resin Components A and B in Toner>>

One example of separating the polyester resin components A and B when measuring respective glass transition temperatures TgA, TgB and TgAB of the polyester resin components A, B and a mixture thereof is explained hereunder.

First, 1 g of a toner is placed in 100 mL of THF to be Soxhlet-extracted to extract THF-soluble and insoluble components. These are dried by a vacuum drier for 24 hrs to obtain polyester resin components A and B.

<<Method of Preparing Mixture of Polyester Resin Components A and B>>

The above polyester resin components A and B are mixed at a weight ratio of the polyester resin A to the polyester resin B of from 0.05 to 0.30, and the mixture is melted at 150° C. to obtain a mixture thereof.

<<Methods of Measuring Melting Point and Glass Transition Temperature (Tg)>>

In the present invention, a melting point and a glass transition temperature (Tg) of the toner can be measured, for example, by a differential scanning calorimeter (DSC) system (Q-200, product of TA Instruments Japan Inc.).

Specifically, a melting point and a glass transition temperature of samples can be measured in the following manners.

Specifically, first, an aluminum sample container charged with about 5.0 mg of a sample is placed on a holder unit, and the holder unit is then set in an electric furnace. Next, the sample is heated (first heating) from −80° C. to 150° C. at the heating rate of 10° C./min in a nitrogen atmosphere. Then, the sample is cooled from 150° C. to −80° C. at the cooling rate of 10° C./min, followed by again heating (second heating) to 150° C. at the heating rate of 10° C./min. DSC curves are respectively measured for the first heating and the second heating by a differential scanning calorimeter (Q-200, product of TA Instruments Japan Inc.).

The DSC curve for the first heating is selected from the obtained DSC curve by an analysis program stored in the Q-200 system, to thereby determine a glass transition temperature of the sample with the first heating. Similarly, the DSC curve for the second heating is selected, and the glass transition temperature of the sample with the second heating can be determined.

Moreover, the DSC curve for the first heating is selected from the obtained DSC curve by the analysis program stored in the Q-200 system, and an endothermic peak top temperature of the sample for the first heating is determined as a melting point of the sample. Similarly, the DSC curve for the second heating is selected, and the endothermic peak top temperature of the sample for the second heating can be determined as a melting point of the sample with the second heating.

Moreover, in the present invention, regarding the glass transition temperature and the melting point of the polyester resin components A and B, a mixture thereof, the crystalline polyester resin, and the other constituent components such as the release agent, the endothermic peak top temperature and the Tg in second heating are defined as the melting point and the Tg of each of the target samples, respectively, unless otherwise specified.

<<Measurement of THF Soluble Molecular Weight>>

Gel permeation chromatography (GPC) measuring apparatus: GPC-8220GPC (product of TOSOH CORPORATION)

Column: TSKgel Super HZM-H 15 cm, 3 columns connected (product of TOSOH CORPORATION)

Temperature: 40° C.

Solvent: Tetrahydrofuran (THF)

Flow rate: 0.35 mL/min

Sample: 0.15% by weight sample (0.3 mL) applied

Pretreatment of sample: The toner is dissolved in tetrahydrofuran (THF) (containing a stabilizer, product of Wako Pure Chemical Industries, Ltd.) in a concentration of 0.15% by weight, and the solution is filtrated with a 0.2-μm filter. The resultant filtrate is used as a sample. This THF sample solution (300 μL) is applied for measurement. In the measurement of the molecular weight of the sample, the molecular weight distribution of the sample is determined based on the relationship between the logarithmic value and the count number of a calibration curve given by using several monodisperse polystyrene-standard samples. The standard polystyrene samples used for giving the calibration curve are Showdex STANDARD Std. Nos. S-7300, S-210, S-390, S-875, S-1980, S-10.9, S-629, S-3.0 and S-0.580, toluene (these products are of SHOWA DENKO K.K.). The detector used is a refractive index (RI) detector.

<<Measurement of THF Insoluble Molecular Weight>>

Gel permeation chromatography (GPC) measuring apparatus: HLC-8220GPC (product of TOSOH CORPORATION)

Column: TSKgel GMHHR-H(20) HT, 3 columns connected (product of TOSOH CORPORATION)

Temperature: 140° C.

Solvent: Trichlorobenzene

Flow rate: 1 mL/min

Sample: 0.15% by weight sample (0.3 mL) applied

Pretreatment of sample: The toner is dissolved in trichlorobenzene (product of Wako Pure Chemical Industries, Ltd.) in a concentration of 0.15% by weight, and the solution is filtrated with a 0.2-μm filter. The resultant filtrate is used as a sample. This THF sample solution (300 μL) is applied for measurement. In the measurement of the molecular weight of the sample, the molecular weight distribution of the sample is determined based on the relationship between the logarithmic value and the count number of a calibration curve given by using several monodisperse polystyrene-standard samples. The standard polystyrene samples used for giving the calibration curve are Showdex STANDARD Std. Nos. S-7300, S-210, S-390, S-875, S-1980, S-10.9, S-629, S-3.0 and S-0.580, toluene (these products are of SHOWA DENKO K.K.). The detector used is a refractive index (RI) detector.

<Toner Production Method>

A method for producing the toner is not particularly limited and may be appropriately selected depending on the intended purpose.

The toner is preferably granulated by dispersing an oil phase in an aqueous medium, where the oil phase contains the polyester resin components A and B, preferably contains the crystalline polyester resin, and further contains the release agent and the colorant if necessary.

Moreover, the toner contains, as the polyester resin components A and B, a polyester resin that is the prepolymer having a urethane bond and/or a urea bond, and the other polyester resin that has neither a urethane bond nor a urea bond, and preferably contains the crystalline polyester resin. The toner is more preferably granulated by dispersing an oil phase in an aqueous medium, where the oil phase contains the curing agent, the release agent, and the colorant, if necessary.

One example of such methods for producing the toner is a known dissolution suspension method.

As one example of the methods for producing the toner, a method for forming toner base particles while forming the polyester resin through elongating reaction and/or crosslinking reaction between the prepolymer and the curing agent will be described hereinafter.

This method includes preparing an aqueous medium, preparing an oil phase containing toner materials, emulsifying or dispersing the toner materials, and removing an organic solvent.

—Preparation of Aqueous Medium (Aqueous Phase)—

The preparation of the aqueous phase can be carried out, for example, by dispersing resin particles in an aqueous medium. An amount of the resin particles added to the aqueous medium is not particularly limited and may be appropriately selected depending on the intended purpose, but it is preferably 0.5 parts by weight to 10 parts by weight relative to 100 parts by weight of the aqueous medium.

The aqueous medium is not particularly limited and may be appropriately selected depending on the intended purpose. Examples thereof include water, a solvent miscible with water, and a mixture thereof. These may be used alone or in combination of two or more thereof. Among them, water is preferable.

The solvent miscible with water is not particularly limited and may be appropriately selected depending on the intended purpose. Examples thereof include alcohol, dimethyl formamide, tetrahydrofuran, cellosolve, and lower ketone. The alcohol is not particularly limited and may be appropriately selected depending on the intended purpose. Examples thereof include methanol, isopropanol, and ethylene glycol. The lower ketone is not particularly limited and may be appropriately selected depending on the intended purpose. Examples thereof include acetone and methyl ethyl ketone.

—Preparation of Oil Phase—

Preparation of the oil phase containing the toner materials can be performed by dissolving or dispersing toner materials in an organic solvent, where the toner materials contain a polyester resin that is the prepolymer having a urethane bond and/or a urea bond, and the another polyester resin that has neither a urethane bond nor a urea bond, and the crystalline polyester resin, and further contain the curing agent, the release agent, the colorant, if necessary.

The organic solvent is not particularly limited and may be appropriately selected depending on the intended purpose, but it is preferably an organic solvent having a boiling point of less than 150° C., as removal thereof is easy.

The organic solvent having the boiling point of less than 150° C. is not particularly limited and may be appropriately selected depending on the intended purpose. Examples thereof include toluene, xylene, benzene, carbon tetrachloride, methylene chloride, 1, 2-dichloroethane, 1, 1, 2-trichloroethane, trichloroethylene, chloroform, monochlorobenzene, dichloroethylidene, methyl acetate, ethyl acetate, methyl ethyl ketone, and methyl isobutyl ketone. These may be used alone or in combination.

Among them, ethyl acetate, toluene, xylene, benzene, methylene chloride, 1, 2-dichloroethane, chloroform, and carbon tetrachloride are particularly preferable, and ethyl acetate is more preferably used.

—Emulsification or Dispersion—

The emulsification or dispersion of the toner materials can be carried out by dispersing the oil phase containing the toner materials in the aqueous medium. In the course of the emulsification or dispersion of the toner materials, the curing agent and the prepolymer are allowed to carry out a chain-elongation reaction and/or cross-linking reaction.

The reaction time is not particularly limited and may be appropriately selected depending on the intended purpose, but it is preferably from 10 min to 40 hrs, more preferably from 2 hrs to 24 hrs.

The reaction temperature is not particularly limited and may be appropriately selected depending on the intended purpose, but it is preferably 0° C. to 150° C., more preferably 40° C. to 98° C.

A method for stably forming a dispersion liquid containing the polyester prepolymer in the aqueous medium is not particularly limited and may be appropriately selected depending on the intended purpose. Examples thereof include a method for dispersing an oil phase, which is added to an aqueous medium, with shear force, where the oil phase is prepared by dissolving or dispersing toner materials in a solvent.

A disperser used for the dispersing is not particularly limited and may be appropriately selected depending on the intended purpose. Examples thereof include a low-speed shearing disperser, a high-speed shearing disperser, a friction disperser, a high-pressure jetting disperser and an ultrasonic wave disperser. Among them, the high-speed shearing disperser is preferable, because it can control the particle diameters of the dispersed elements (oil droplets) to the range of 2 µm to 20 µm.

In the case where the high-speed shearing disperser is used, the conditions for dispersing, such as the rotating speed, dispersion time, and dispersion temperature, may be appropriately selected depending on the intended purpose.

The rotational speed is not particularly limited and may be appropriately selected depending on the intended purpose, but it is preferably 1,000 rpm to 30,000 rpm, more preferably 5,000 rpm to 20,000 rpm.

The dispersion time is not particularly limited and may be appropriately selected depending on the intended purpose, but it is preferably 0.1 min to 5 min in case of a batch system. The dispersion temperature is not particularly limited and may be appropriately selected depending on the intended purpose, but it is preferably 0° C. to 150° C., more preferably 40° C. to 98° C. under pressure. Note that, generally speaking, dispersion can be easily carried out, as the dispersion temperature is higher.

An amount of the aqueous medium used for the emulsification or dispersion of the toner material is not particularly limited and may be appropriately selected depending on the intended purpose, but it is preferably 50 parts by weight to 2,000 parts by weight, more preferably 100 parts by weight to 1,000 parts by weight, relative to 100 parts by weight of the toner material. When the amount of the aqueous medium is less than 50 parts by weight, the dispersion state of the toner material is impaired, which may result a failure in attaining toner base particles having desired particle diameters. When the amount thereof is more than 2,000 parts by weight, the production cost may increase.

When the oil phase containing the toner material is emulsified or dispersed, a dispersant is preferably used for the purpose of stabilizing dispersed elements, such as oil droplets, and gives a sharp particle size distribution as well as giving desirable shapes of toner particles.

The dispersant is not particularly limited and may be appropriately selected depending on the intended purpose. Examples thereof include a surfactant, a water-insoluble inorganic compound dispersant, and a polymer protective colloid. These may be used alone or in combination. Among them, the surfactant is preferably used.

The surfactant is not particularly limited and may be appropriately selected depending on the intended purpose. Examples thereof include an anionic surfactant, a cationic surfactant, a nonionic surfactant, and an amphoteric surfactant. The anionic surfactant is not particularly limited and may be appropriately selected depending on the intended purpose. Examples thereof include alkyl benzene sulfonic acid salts, $\alpha$-olefin sulfonic acid salts and phosphoric acid esters. Among them, those having a fluoroalkyl group are preferably used.

—Removal of Organic Solvent—

A method for removing the organic solvent from the dispersion liquid such as the emulsified slurry is not particularly limited and may be appropriately selected depending on the intended purpose. Examples thereof include: a method in which an entire reaction system is gradually heated to evaporate out the organic solvent in the oil droplets; and a method in which the dispersion liquid is sprayed in a dry atmosphere to remove the organic solvent in the oil droplets.

As the organic solvent removed, toner base particles are formed. The toner base particles can be subjected to washing and drying, and can be further subjected to classification. The classification may be carried out in a liquid by removing small particles by cyclone, a decanter, or centrifugal separator, or may be performed on particles after drying.

The obtained toner base particles may be mixed with particles such as the external additive and the charge controlling agent. At this time, by applying a mechanical impact during mixing, the particles such as the external additive can be prevented from fall off from surfaces of toner base particles.

A method for applying the mechanical impact is not particularly limited and may be appropriately selected depending on the intended purpose. Examples thereof include: a method for applying impulse force to a mixture by a blade rotating at high speed; a method for adding a mixture into a high-speed air flow and accelerating the speed of the flow to thereby make the particles crash into other particles, or make the composite particles crush into an appropriate impact board.

A device used for this method is appropriately selected depending on the intended purpose without any limitation, and examples thereof include ANGMILL (product of Hosokawa Micron Corporation), an apparatus produced by modifying I-type mill (product of Nippon Pneumatic Mfg. Co., Ltd.) to reduce the pulverizing air pressure, a hybridization system (product of Nara Machinery Co., Ltd.), a krypton system (product of Kawasaki Heavy Industries, Ltd.) and an automatic mortar.

(Developer)

A developer of the present invention contains at least the toner, and may further contain appropriately selected other components, such as carrier, if necessary. Accordingly, the developer has excellent transfer properties, and charging ability, and can stably form high quality images. Note that, the developer may be a one-component developer, or a two-component developer, but it is preferably a two-component developer when it is used in a high speed printer corresponding to recent high information processing speed, because the service life thereof can be improved.

In the case where the developer is used as a one-component developer, the diameters of the toner particles do not vary largely even when the toner is supplied and consumed repeatedly, the toner does not cause filming to a developing roller, nor fuse to a layer thickness regulating member such as a blade for thinning a thickness of a layer of the toner, and provides excellent and stable developing ability and image even when it is stirred in the developing device over a long period of time.

In the case where the developer is used as a two-component developer, the diameters of the toner particles in the developer do not vary largely even when the toner is supplied and consumed repeatedly, and the toner can provide excellent and stabile developing ability even when the toner is stirred in the developing device over a long period of time.

<Carrier>

The carrier is appropriately selected depending on the intended purpose without any limitation, but it is preferably a carrier containing a core, and a resin layer covering the core.

—Core—

A material of the core is appropriately selected depending on the intended purpose without any limitation, and examples thereof include a 50 emu/g to 90 emu/g manganese-strontium (Mn—Sr) material, and a 50 emu/g to 90 emu/g manganese-magnesium (Mn—Mg) material. To secure a sufficient image density, use of a hard magnetic material such as iron powder (100 emu/g or more), and magnetite (75 emu/g to 120 emu/g) is preferable. Moreover, use of a soft magnetic material such as a 30 emu/g to 80 emu/g copper-zinc material is preferable because an impact applied to a photoconductor by the developer born on a bearer in the form of a brush can be reduced, which is an advantageous for improving image quality.

These may be used alone or in combination.

The volume-average particle diameter of the core is not particularly limited and may be appropriately selected depending on the intended purpose, but it is preferably 10 µm to 150 µm, more preferably 40 µm to 100 µm. When the volume average particle diameter thereof is less than 10 µm, the proportion of particles in the distribution of carrier particle diameters increases, causing carrier scattering because of low magnetization per carrier particle. When the volume average particle diameter thereof is more than 150 µm, the specific surface area reduces, which may cause toner scattering, causing reproducibility especially in a solid image portion in a full color printing containing many solid image portions.

In the case where the toner is used for a two-component developer, the toner is used by mixing with the carrier. An amount of the carrier in the two-component developer is not particularly limited and may be appropriately selected depending on the intended purpose, but it is preferably 90 parts by weight to 98 parts by weight, more preferably 93 parts by weight to 97 parts by weight, relative to 100 parts by weight of the two-component developer.

A developer of the present invention may be suitably used in image formation by various known electrophotographic methods such as a magnetic one-component developing method, a non-magnetic one-component developing method, and a two-component developing method.

(Developer Container)

A developer container of the present invention accommodates the developer of the present invention. The container thereof is not particularly limited and may be appropriately selected from known containers. Examples thereof include those having a cap and a container main body.

A size, a shape, a structure and materials of the container main body are not particularly limited. The container main body preferably has, for example, a hollow-cylindrical shape. Particularly preferably, it is a hollow-cylindrical body whose inner surface has spirally-arranged concavo-convex portions some or all of which can accordion and in which the developer accommodated can be transferred to an outlet port through rotation. The materials for the developer-accommodating container are not particularly limited and are preferably those from which the container main body can be formed with high dimensional accuracy. Examples thereof include polyester resins, polyethylene resins, polypropylene resins, polystyrene resins, polyvinyl chloride resins, polyacrylic acids, polycarbonate resins, ABS resins and polyacetal resins.

The above developer accommodating container is excellent in easiness of storage and transportation and handling of the container. Therefore, it can be detachably attached to the below-described process cartridge and image forming apparatus, and can be used for supplying a developer.

(Image Forming Apparatus and Image Forming Method)

An image forming apparatus of the present invention includes at least an electrostatic latent image bearer, an electrostatic latent image forming unit, and a developing unit, and if necessary, further includes other units.

An image forming method of the present invention includes at least an electrostatic latent image forming step and a developing step, and if necessary, further includes other steps.

<Electrostatic Latent Image Bearer>

The material, structure and size of the electrostatic latent image bearer are not particularly limited and may be appropriately selected depending on the intended purpose. Examples of the material thereof include inorganic photoconductors such as amorphous silicon and selenium and organic photoconductors such as polysilane and phthalopolymethine. Among them, amorphous silicon is preferable in terms of long lifetime.

<Electrostatic Latent Image Forming Unit and Electrostatic Latent Image Forming Step>

The electrostatic latent image forming unit is not particularly limited and may be appropriately selected depending on the intended purpose so long as it is a unit configured to form an electrostatic latent image on the electrostatic latent image bearer. Examples thereof include a unit including at least a charging member configured to charge a surface of the electrostatic latent image bearer and an exposing member configured to imagewise expose the surface of the electrostatic latent image bearer to light.

The electrostatic latent image forming step is not particularly limited and may be appropriately selected depending on the intended purpose so long as it is a step of forming an electrostatic latent image on the electrostatic latent image bearer. The electrostatic latent image forming step can be performed using the electrostatic latent image forming unit by, for example, charging a surface of the electrostatic latent image bearer and then imagewise exposing the surface thereof to light.

<<Charging Member and Charging>>

The charging member is not particularly limited and may be appropriately selected depending on the intended purpose. Examples thereof include contact-type charging devices known per se having, for example, an electrically conductive or semiconductive roller, brush, film and rubber blade; and non-contact-type charging devices utilizing corona discharge such as corotron and scorotron.

The charging can be performed by, for example, applying voltage to the surface of the electrostatic latent image bearer by using the charging member.

The charging member may have any shape like a charging roller as well as a magnetic brush or a fur brush. The shape of the charging member may be suitably selected according to the specification or configuration of the image forming apparatus.

The charging member is not limited to the aforementioned contact-type charging members. However, the contact-type charging members are preferably used because an image forming apparatus in which an amount of ozone generated from the charging members is reduced can be obtained <<Irradiation Member and Irradiation>>

The irradiation member is not particularly limited and may be appropriately selected depending on the purpose so long as it attains desired imagewise irradiation on the surface of the electrophotographic latent image bearer charged with the charging member. Examples thereof include various irradiation members such as a copy optical irradiation device, a rod lens array irradiation device, a laser optical irradiation device, and a liquid crystal shutter irradiation device.

A light source used for the irradiation member is not particularly limited and may be appropriately selected depending on the intended purpose. Examples thereof include conventional light-emitting devices such as a fluorescent lamp, a tungsten lamp, a halogen lamp, a mercury lamp, a sodium lamp, a light-emitting diode (LED), a laser diode (LD), and an electroluminescence (EL) device.

Also, various filters may be used for emitting only light having a desired wavelength range. Examples of the filters include a sharp-cut filter, a band-pass filter, an infrared cut filter, a dichroic filter, an interference filter, and a color temperature conversion filter.

The irradiation can be performed by, for example, image-wise irradiating the surface of the electrostatic latent image bearer to light using the irradiation member.

In the present invention, light may be imagewise applied from the backside of the electrostatic latent image bearer.

<Developing Unit and Developing Step>

The developing unit is not particularly limited and may be appropriately selected depending on the intended purpose so long as it is a developing unit containing a toner for developing the electrostatic latent image formed on the electrostatic latent image bearer to thereby form a visible image.

The developing step is not particularly limited and may be appropriately selected depending on the intended purpose so long as it is a step of developing the electrostatic latent image formed on the electrostatic latent image bearer with a toner, to thereby form a visible image. The developing step can be performed by the developing unit.

The developing unit is preferably a developing device containing: a stirring device for charging the toner with friction generated during stirring; a magnetic field-generating unit fixed inside; and a developer bearing member configured to bear a developer containing the toner on a surface thereof and to be rotatable.

<Other Units and Other Steps>

Examples of the other units include a transfer unit, a fixing unit, a cleaning unit, a charge-eliminating unit, a recycling unit, and a controlling unit.

Examples of the other step include a transfer step, a fixing step, a cleaning step, a charge-eliminating step, a recycling step, and a controlling step.

<<Transfer Unit and Transfer Step>>

The transfer unit is not particularly limited and may be appropriately selected depending on the intended purpose so long as it is a unit configured to transfer the visible image onto a recording medium. Preferably, the transfer unit includes: a primary transfer unit configured to transfer the visible images to an intermediate transfer member to form a composite transfer image; and a secondary transfer unit configured to transfer the composite transfer image onto a recording medium.

The transfer step is not particularly limited and may be appropriately selected depending on the intended purpose so long as it is a step of transferring the visible image onto a recording medium. In this step, preferably, the visible images are primarily transferred to an intermediate transfer member, and the thus-transferred visible images are secondarily transferred to the recording medium.

For example, the transfer step can be performed using the transfer unit by charging the photoconductor with a transfer charger to transfer the visible image.

Here, when the image to be secondarily transferred onto the recording medium is a color image of several color toners, a configuration can be employed in which the transfer unit sequentially superposes the color toners on top of another on the intermediate transfer member to form an image on the intermediate transfer member, and the image on the intermediate transfer member is secondarily transferred at one time onto the recording medium by the intermediate transfer unit.

The intermediate transfer member is not particularly limited and may be appropriately selected from known transfer members depending on the intended purpose. For example, the intermediate transfer member is preferably a transferring belt.

The transfer unit (including the primary- and secondary transfer units) preferably includes at least a transfer device which transfers the visible images from the photoconductor onto the recording medium. Examples of the transfer device include a corona transfer device employing corona discharge, a transfer belt, a transfer roller, a pressing transfer roller and an adhesive transferring device.

The recording medium is not particularly limited and may be appropriately selected depending on the purpose, so long as it can receive a developed, unfixed image. Examples of the recording medium include plain paper and a PET base for OHP, with plain paper being used typically.

<<Fixing Unit and Fixing Step>>

The fixing unit is not particularly limited and may be appropriately selected depending on the intended purpose as long as it is a unit configured to fix a transferred image which has been transferred on the recording medium, but is preferably known heating-pressurizing members. Examples thereof include a combination of a heat roller and a press roller, and a combination of a heat roller, a press roller and an endless belt.

The fixing step is not particularly limited and may be appropriately selected depending on the intended purpose, as long as it is a step of fixing a visible image which has been transferred on the recording medium. The fixing step may be performed every time when an image of each color toner is transferred onto the recording medium, or at one time (at the same time) on a laminated image of color toners.

The fixing step can be performed by the fixing unit.

The heating-pressurizing member usually performs heating preferably at 80° C. to 200° C.

Notably, in the present invention, known photofixing devices may be used instead of or in addition to the fixing unit depending on the intended purpose.

A surface pressure at the fixing step is not particularly limited and may be appropriately selected depending on the intended purpose, but is preferably 10 N/cm$^2$ to 80 N/cm$^2$.

<<Cleaning Unit and Cleaning Step>>

The cleaning unit is not particularly limited and may be appropriately selected depending on the intended purpose, as long as it can remove the toner remaining on the photoconductor. Examples thereof include a magnetic brush cleaner, an electrostatic brush cleaner, a magnetic roller cleaner, a blade cleaner, a brush cleaner and a web cleaner.

The cleaning step is not particularly limited and may be appropriately selected depending on the intended purpose, as long as it is a step of removing the toner remaining on the photoconductor. It may be performed by the cleaning unit.

<<Charge-Eliminating Unit and Charge-Eliminating Step>>

The charge-eliminating unit is not particularly limited and may be appropriately selected depending on the intended purpose, as long as it is a unit configured to apply a charge-eliminating bias to the photoconductor to thereby charge-eliminate. Examples thereof include a charge-eliminating lamp.

The charge-eliminating step is not particularly limited and may be appropriately selected depending on the intended purpose, as long as it is a step of applying a charge-eliminating bias to the photoconductor to thereby charge-eliminate. It may be carried out by the charge-eliminating unit.

<<Recycling Unit and Recycling Step>>

The recycling unit is not particularly limited and may be appropriately selected depending on the intended purpose, as long as it is a unit configured to recycle the toner which has been removed at the cleaning step to the developing device. Example thereof includes a known conveying unit.

The recycling step is not particularly limited and may be appropriately selected depending on the intended purpose, as long as it is a step of recycling the toner which has been removed at the cleaning step to the developing device. The recycling step can be performed by the recycling unit.

Exemplary embodiments of the present invention are described in detail below with reference to accompanying drawings. In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of method of forming an image using an image forming apparatus of the present invention will be explained with reference to FIG. 1.

An image forming apparatus 1 is a printer. The image forming apparatus is not particularly limited if it is capable of forming images with a toner, such as copiers, facsimiles and multifunctional machines.

The image forming apparatus 1 includes a paper feeder 210, a conveyor 220, an image former 230, a transferer 240 and a fixer 250.

The paper feeder 210 includes a paper feed cassette 211 papers P to be fed are loaded and a paper feed roller 212 feeding one piece by one of the papers P loaded in the paper feed cassette 211.

The conveyor 220 includes a roller 221 conveying the paper P fed by the paper feed roller 212 in the direction of the transferer 240, a timing roller 222 waiting while pinching an end of the paper P fed by the roller 221 and feeding the paper to the transferer 240 at a predetermined timing, and a paper discharge roller 223 discharging the paper P a color toner image is fixed on onto a paper discharge tray 224.

The image former 230 includes an image forming unit Y using a developer having a yellow toner, an image forming unit C using a developer having a cyan toner, an image forming unit M using a developer having a magenta toner and an image forming unit K using a developer having a black toner in this order from left to right at a predetermined interval in FIG. 1, and an irradiator 233.

An arbitrary image forming unit among the image forming units Y to K is simply referred to as the image forming unit.

The developer includes a toner and a carrier.

The four image forming units Y to K only use developers different from each other and substantially have the same mechanical constitutions.

The transferer 240 includes a drive roller 241, a driven roller 242, an intermediate transfer belt 243 rotatable anti-clockwise as the drive roller 241 drives, first transfer rollers 244Y, 244C, 244M and 244K facing a photoconductor drum 231 through the intermediate transfer belt 243, and a second facing roller 245 and a second transfer roller 246 opposite to each other through the intermediate transfer belt 243 at a transfer position where a toner image is transferred to a paper.

The fixer 250 includes a heater inside, and a fixing belt 251 heating a paper P and a pressure roller 252 rotatably pressuring the fixing belt 251 to form a nip, which applies heat and pressure to a toner image on the paper P to be fixed thereon. The paper P the color toner image is fixed on is discharged by the paper discharge roller 223 onto the paper discharge tray 224.

(Process Cartridge)

A process cartridge of the present invention is molded so as to be mounted to various image forming apparatuses in an attachable and detachable manner, including at least an electrostatic latent image bearer configured to bear an electrostatic latent image; and a developing unit configured to form a toner image by developing the electrostatic latent image born on the electrostatic latent image bearer with a developer of the present invention. Note that, the process cartridge of the present invention may further include other units, if necessary.

The developing unit includes a developer accommodating container configured to accommodate the developer of the present invention, and a developer bearing member configured to bear and convey the developer accommodated in the developer accommodating container. Note that, the developing unit further includes a regulating member, and the like, in order to regulate a thickness of the developer born.

FIG. 5 illustrates one example of a process cartridge of the present invention. A process cartridge 110 includes a photoconductor drum 10, a corona charging device 52, a developing device 40, a transfer roller 80, and a cleaning device 90.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Production Example 1

Synthesis of Ketimine

A reaction container equipped with a stirring rod and a thermometer was charged with isophorone diisocyanate (170 parts) and methyl ethyl ketone (75 parts), followed by reaction at 50° C. for 5 hrs, to thereby obtain [ketimine compound 1].

The amine value of the obtained [ketimine compound 1] was found to be 418.

Production Example a-1

Synthesis of Amorphous Polyester Resin a-1

—Synthesis of Prepolymer a-1—

A reaction vessel equipped with a condenser, a stirring device, and a nitrogen-introducing tube was charged with 3-methyl-1, 5-pentanediol, terephthalic acid, adipic acid and trimethylol propane so that a ratio by mole of hydroxyl group to carboxyl group "OH/COOH" was 1.5. A diol component was composed of 100 mol % of 3-methyl-1, 5-pentanediol, and a dicarboxylic acid component was composed of 50 mol % of terephthalic acid and 50 mol % of adipic acid. Moreover, titanium tetraisopropoxide (1,000 ppm relative to the resin component) was added thereto such that the amount of trimethylol propane was 1 mol % in total monomers.

Thereafter, the resultant mixture was heated to 200° C. for about 4 hrs, then was heated to 230° C. for 2 hrs, and was allowed to react until no flowing water was formed.

Thereafter, the reaction mixture was allowed to further react for 5 hrs under a reduced pressure of 10 mmHg to 15 mmHg, to thereby obtain an intermediate polyester a-1.

The obtained intermediate polyester a-1 was found to have a Tg of −40° C., a Mw of 10,000, and a Mw/Mn of 2.5.

Next, a reaction vessel equipped with a condenser, a stirring device, and a nitrogen-introducing tube was charged with the intermediate polyester a-1 solution and isophorone diisocyanate (IPDI) at a ratio by mole (isocyanate group of IPDI/hydroxyl group of the intermediate polyester) of 1.8. The resultant mixture was diluted with ethyl acetate so as to be a 50% ethyl acetate solution, followed by reacting at 100° C. for 5 hrs, to thereby obtain a prepolymer a-1.

—Synthesis of Amorphous Polyester Resin a-1—

The obtained prepolymer a-1 was stirred in a reaction vessel equipped with a heating device, a stirring device, and a nitrogen-introducing tube. The [ketimine compound 1] was added dropwise to the reaction vessel in such an amount that an amount by mole of amine in the [ketimine compound 1] was equal to an amount by mole of isocyanate in the prepolymer a-1. The reaction mixture was stirred at 45° C. for 10 hrs, and then a prepolymer product extended was taken out.

The obtained prepolymer product extended was dried at 50° C. under a reduced pressure until an amount of the remaining ethyl acetate was 100 ppm or less, to thereby obtain an amorphous polyester resin a-1.

Physical properties of the obtained amorphous polyester resin a-1 are given in Table 1.

Production Example a-2

Synthesis of Amorphous Polyester Resin a-2

—Synthesis of Prepolymer a-2—

A reaction vessel equipped with a condenser, a stirring device, and a nitrogen-introducing tube was charged with 3-methyl-1, 5-pentanediol, terephthalic acid, adipic acid and trimethylol propane so that a ratio by mole of hydroxyl group to carboxyl group "OH/COOH" was 1.3. A diol component was composed of 100 mol % of 3-methyl-1, 5-pentanediol, and a dicarboxylic acid component was composed of 45 mol % of terephthalic acid and 55 mol % of adipic acid. Moreover, titanium tetraisopropoxide (1,000 ppm relative to the resin component) was added thereto such that the amount of trimethylol propane was 1 mol % in total monomers.

Thereafter, the resultant mixture was heated to 200° C. for about 4 hrs, then was heated to 230° C. for 2 hrs, and was allowed to react until no flowing water was formed.

Thereafter, the reaction mixture was allowed to further react for 5 hrs under a reduced pressure of 10 mmHg to 15 mmHg, to thereby obtain an intermediate polyester a-2.

The obtained intermediate polyester a-2 was found to have a Tg of −42° C., a Mw of 12,000, and a Mw/Mn of 2.5.

Next, a reaction vessel equipped with a condenser, a stirring device, and a nitrogen-introducing tube was charged with the intermediate polyester a-2 and isophorone diisocyanate (IPDI) at a ratio by mole (isocyanate group of IPDI/hydroxyl group of the intermediate polyester) of 1.7. The resultant mixture was diluted with ethyl acetate so as to be a 50% ethyl acetate solution, followed by reacting at 100° C. for 8 hrs, to thereby obtain a prepolymer a-2.

—Synthesis of Amorphous Polyester Resin a-2—

The obtained prepolymer a-2 was stirred in a reaction vessel equipped with a heating device, a stirring device, and a nitrogen-introducing tube. The [ketimine compound 1] was added dropwise to the reaction vessel in such an amount that an amount by mole of amine in the [ketimine compound 1] was equal to an amount by mole of isocyanate in the prepolymer a-2. The reaction mixture was stirred at 45° C. for 10 hrs, and then a prepolymer product extended was taken out.

The obtained prepolymer product extended was dried at 50° C. under a reduced pressure until an amount of the remaining ethyl acetate was 100 ppm or less, to thereby obtain an amorphous polyester resin a-2.

Physical properties of the obtained amorphous polyester resin a-2 are given in Table 1.

Production Example a-3

Synthesis of Amorphous Polyester Resin a-3

—Synthesis of Prepolymer a-3—

A reaction vessel equipped with a condenser, a stirring device, and a nitrogen-introducing tube was charged with 3-methyl-1, 5-pentanediol, isophthalic acid, dodecanedioic acid and trimethylol propane so that a ratio by mole of hydroxyl group to carboxyl group "OH/COOH" was 1.5. A diol component was composed of 100 mol % of 3-methyl-1, 5-pentanediol, and a dicarboxylic acid component was composed of 75 mol % of isophthalic acid and 25 mol % of dodecanedioic acid. Moreover, titanium tetraisopropoxide (1,000 ppm relative to the resin component) was added thereto such that the amount of trimethylol propane was 1 mol % in total monomers.

Thereafter, the resultant mixture was heated to 200° C. for about 4 hrs, then was heated to 230° C. for 2 hrs, and was allowed to react until no flowing water was formed.

Thereafter, the reaction mixture was allowed to further react for 5 hrs under a reduced pressure of 10 mmHg to 15 mmHg, to thereby obtain an intermediate polyester a-3.

The obtained intermediate polyester a-3 was found to have a Tg of −40° C., a Mw of 10,000, and a Mw/Mn of 2.8.

Next, a reaction vessel equipped with a condenser, a stirring device, and a nitrogen-introducing tube was charged with the intermediate polyester a-3 and isophorone diisocyanate (IPDI) at a ratio by mole (isocyanate group of IPDI/hydroxyl group of the intermediate polyester) of 1.8. The resultant mixture was diluted with ethyl acetate so as to be a 50% ethyl acetate solution, followed by reacting at 100° C. for 5 hrs, to thereby obtain a prepolymer a-3.

—Synthesis of Amorphous Polyester Resin a-3—

The obtained prepolymer a-3 was stirred in a reaction vessel equipped with a heating device, a stirring device, and a nitrogen-introducing tube. The [ketimine compound 1] was added dropwise to the reaction vessel in such an amount that an amount by mole of amine in the [ketimine compound 1] was equal to an amount by mole of isocyanate in the prepolymer a-3. The reaction mixture was stirred at 45° C. for 10 hrs, and then a prepolymer product extended was taken out.

The obtained prepolymer product extended was dried at 50° C. under a reduced pressure until an amount of the remaining ethyl acetate was 100 ppm or less, to thereby obtain an amorphous polyester resin a-3.

Physical properties of the obtained amorphous polyester resin a-3 are given in Table 1.

Production Example a-4

Synthesis of Amorphous Polyester Resin a-4

—Synthesis of Prepolymer a-4—

A reaction vessel equipped with a condenser, a stirring device, and a nitrogen-introducing tube was charged with 3-methyl-1, 5-pentanediol, isophthalic acid, adipic acid and trimellitic acid anhydride so that a ratio by mole of hydroxyl group to carboxyl group "OH/COOH" was 1.5. A diol component was composed of 100 mol % of 3-methyl-1, 5-pentanediol, and a dicarboxylic acid component was composed of 40 mol % of isophthalic acid and 60 mol % of adipic acid. Moreover, titanium tetraisopropoxide (1,000 ppm relative to the resin component) was added thereto such that the amount of trimellitic acid anhydride was 1 mol % in total monomers.

Thereafter, the resultant mixture was heated to 200° C. for about 4 hrs, then was heated to 230° C. for 2 hrs, and was allowed to react until no flowing water was formed.

Thereafter, the reaction mixture was allowed to further react for 5 hrs under a reduced pressure of 10 mmHg to 15 mmHg, to thereby obtain an intermediate polyester a-4.

The obtained intermediate polyester a-4 was found to have a Tg of −50° C., a Mw of 18,000, and a Mw/Mn of 2.4.

Next, a reaction vessel equipped with a condenser, a stirring device, and a nitrogen-introducing tube was charged with the intermediate polyester a-4 and isophorone diisocyanate (IPDI) at a ratio by mole (isocyanate group of IPDI/hydroxyl group of the intermediate polyester) of 2.0. The resultant mixture was diluted with ethyl acetate so as to be a 50% ethyl acetate solution, followed by reacting at 100° C. for 5 hrs, to thereby obtain a prepolymer a-4.
—Synthesis of Amorphous Polyester Resin a-4—

The obtained prepolymer a-4 was stirred in a reaction vessel equipped with a heating device, a stirring device, and a nitrogen-introducing tube. The [ketimine compound 1] was added dropwise to the reaction vessel in such an amount that an amount by mole of amine in the [ketimine compound 1] was equal to an amount by mole of isocyanate in the prepolymer a-4. The reaction mixture was stirred at 45° C. for 10 hrs, and then a prepolymer product extended was taken out.

The obtained prepolymer product extended was dried at 50° C. under a reduced pressure until an amount of the remaining ethyl acetate was 100 ppm or less, to thereby obtain an amorphous polyester resin a-4.

Physical properties of the obtained amorphous polyester resin a-4 are given in Table 1.
<Synthesis of Amorphous Polyester Resin a-5>
—Synthesis of Prepolymer a-5—

A reaction vessel equipped with a condenser, a stirring device, and a nitrogen-introducing tube was charged with 3-methyl-1, 5-pentanediol, terephthalic acid, adipic acid and trimethylol propane so that a ratio by mole of hydroxyl group to carboxyl group "OH/COOH" was 1.5. A diol component was composed of 100 mol % of 3-methyl-1, 5-pentanediol, and a dicarboxylic acid component was composed of 25 mol % of terephthalic acid and 75 mol % of adipic acid. Moreover, titanium tetraisopropoxide (1,000 ppm relative to the resin component) was added thereto such that the amount of trimethylol propane was 1 mol % in total monomers.

Thereafter, the resultant mixture was heated to 200° C. for about 4 hrs, then was heated to 230° C. for 2 hrs, and was allowed to react until no flowing water was formed.

Thereafter, the reaction mixture was allowed to further react for 5 hrs under a reduced pressure of 10 mmHg to 15 mmHg, to thereby obtain an intermediate polyester a-5.

The obtained intermediate polyester a-2 was found to have a Tg of −55° C., a Mw of 11,000, and a Mw/Mn of 2.4.

Next, a reaction vessel equipped with a condenser, a stirring device, and a nitrogen-introducing tube was charged with the intermediate polyester a-5 and isophorone diisocyanate (IPDI) at a ratio by mole (isocyanate group of IPDI/hydroxyl group of the intermediate polyester) of 1.8. The resultant mixture was diluted with ethyl acetate so as to be a 50% ethyl acetate solution, followed by reacting at 100° C. for 5 hrs, to thereby obtain a prepolymer a-5.
—Synthesis of Amorphous Polyester Resin a-5—

The obtained prepolymer a-5 was stirred in a reaction vessel equipped with a heating device, a stirring device, and a nitrogen-introducing tube. The [ketimine compound 1] was added dropwise to the reaction vessel in such an amount that an amount by mole of amine in the [ketimine compound 1] was equal to an amount by mole of isocyanate in the prepolymer a-4. The reaction mixture was stirred at 45° C. for 10 hrs, and then a prepolymer product extended was taken out.

The obtained prepolymer product extended was dried at 50° C. under a reduced pressure until an amount of the remaining ethyl acetate was 100 ppm or less, to thereby obtain an amorphous polyester resin a-5.

Physical properties of the obtained amorphous polyester resin a-5 are given in Table 1.

Production Example b-1

Synthesis of Amorphous Polyester Resin b-1

A four-necked flask equipped with a nitrogen-introducing tube, a dehydration tube, a stirring device, and a thermocouple was charged with bisphenol A ethylene oxide 2 mole adduct, bisphenol A propylene oxide 3 mole adduct, terephthalic acid, adipic acid and trimethylol propane so that a ratio by mole of bisphenol A ethylene oxide 2 mole adduct to bisphenol A propylene oxide 3 mole adduct (bisphenol A ethylene oxide 2 mole adduct/bisphenol A propylene oxide 3 mole adduct) was set to 85/15, a ratio by mole of terephthalic acid to adipic acid (terephthalic acid/adipic acid) was set to 80/20, the amount of trimethylol propane was 1 mol % in total monomers, and a ratio by mole of hydroxyl group to carboxyl group "OH/COOH" was 1.2. Moreover, titanium tetraisopropoxide (500 ppm relative to the resin component) was added thereto and the resultant mixture was allowed to react under normal pressure at 230° C. for 8 hrs and then to further react under a reduced pressure of 10 mmHg to 15 mmHg for 4 hrs. Then, trimellitic anhydride was added to the vessel so that an amount thereof was 1 mol % relative to the total resin component, followed by reacting at 180° C. under normal pressure for 3 hrs, to thereby obtain an amorphous polyester resin b-1.

Physical properties of the obtained amorphous polyester resin b-1 are given in Table 1.

Production Example b-2

Synthesis of Amorphous Polyester Resin b-2

A four-necked flask equipped with a nitrogen-introducing tube, a dehydration tube, a stirring device, and a thermocouple was charged with bisphenol A ethylene oxide 2 mole adduct, bisphenol A propylene oxide 3 mole adduct, terephthalic acid, and adipic acid so that a ratio by mole of bisphenol A ethylene oxide 2 mole adduct to bisphenol A propylene oxide 3 mole adduct (bisphenol A ethylene oxide 2 mole adduct/bisphenol A propylene oxide 3 mole adduct) was set to 85/15, a ratio by mole of terephthalic acid to adipic acid (terephthalic acid/adipic acid) was set to 80/20, and a ratio by mole of hydroxyl group to carboxyl group "OH/COOH" was 1.2. Moreover, titanium tetraisopropoxide (500 ppm relative to the resin component) was added thereto and the resultant mixture was allowed to react under normal pressure at 230° C. for 8 hrs and then to further react under a reduced pressure of 10 mmHg to 15 mmHg for 4 hrs. Then, trimellitic anhydride was added to the vessel so that an amount thereof was 1 mol % relative to the total resin component, followed by reacting at 180° C. under normal pressure for 3 hrs, to thereby obtain an amorphous polyester resin b-2.

Physical properties of the obtained amorphous polyester resin b-2 are given in Table 1.

Production Example b-3

Synthesis of Amorphous Polyester Resin b-3

A four-necked flask equipped with a nitrogen-introducing tube, a dehydration tube, a stirring device, and a thermocouple was charged with bisphenol A ethylene oxide 2 mole adduct, bisphenol A propylene oxide 3 mole adduct, terephthalic acid, adipic acid and trimethylol propane so that a ratio by mole of bisphenol A ethylene oxide 2 mole adduct to bisphenol A propylene oxide 3 mole adduct (bisphenol A ethylene oxide 2 mole adduct/bisphenol A propylene oxide 3 mole adduct) was set to 85/15, a ratio by mole of terephthalic acid to adipic acid (terephthalic acid/adipic acid) was set to 90/10, the amount of trimethylol propane was 1 mol % in total monomers, and a ratio by mole of hydroxyl group to carboxyl group "OH/COOH" was 1.15. Moreover, titanium tetraisopropoxide (500 ppm relative to the resin component) was added thereto and the resultant mixture was allowed to react under normal pressure at 230° C. for 8 hrs and then to further react under a reduced pressure of 10 mmHg to 15 mmHg for 4 hrs. Then, trimellitic anhydride was added to the vessel so that an amount thereof was 1 mol % relative to the total resin component, followed by reacting at 180° C. under normal pressure for 3 hrs, to thereby obtain an amorphous polyester resin b-3.

Physical properties of the obtained amorphous polyester resin b-3 are given in Table 1.

Production Example c-1

Synthesis of Crystalline Polyester Resin c-1

A four-necked flask of 5 L equipped with a nitrogen-introducing tube, a dehydration tube, a stirring device, and a thermocouple was charged with sebacic acid and ethylene glycol so that a ratio by mole of hydroxyl group to carboxyl group "OH/COOH" was 0.95. Moreover, titanium tetraisopropoxide (500 ppm relative to the resin component) was added thereto, and the resultant mixture was allowed to react at 180° C. for 10 hrs, heated to 200° C., allowed to react 3 hrs, and then to further react under a pressure of 8.3 kPa for 2 hrs to thereby obtain a crystalline polyester resin c-1.

Physical properties of the obtained crystalline polyester resin c-1 are given in Table 1.

Example 1

Preparation of Master Batch (Mb)

Water (1,200 parts), 500 parts of carbon black (PRINTEX 35, product of Degussa) [DBP oil absorption amount=42 mL/100 mg, pH=9.5], and 500 parts of the polyester resin B-1 were added and mixed together by HENSCHEL MIXER (product of Mitsui Mining Co., Ltd.), and the resultant mixture was kneaded by a two roll mill for 30 min at 150° C. The kneaded product was rolled out and cooled, followed by pulverizing by a pulverizer, to thereby obtain [master batch 1].

<Preparation of WAX Dispersion Liquid>

A vessel to which a stirring bar and a thermometer had been set was charged with 50 parts of paraffin wax (HNP-9, product of Nippon Seiro Co., Ltd., hydrocarbon wax, melting point: 75° C., SP value: 8.8) as release agent 1, and 450 parts of ethyl acetate, followed by heating to 80° C. during stirring. The temperature was maintained at 80° C. for 5 hrs, and then the mixture was cooled to 30° C. in 1 hr. The resultant mixture was dispersed by a bead mill (ULTRA VISCOMILL, product of AIMEX CO., Ltd.) under the following conditions: a liquid feed rate of 1 kg/hr, disc circumferential velocity of 6 m/s, zirconia beads having a diameter of 0.5 mm packed to 80% by volume, and 3 passes, to thereby obtain [WAX dispersion liquid 1].

<Preparation of Crystalline Polyester Resin Dispersion Liquid>

A vessel to which a stirring bar and a thermometer had been set was charged with 50 parts of the crystalline polyester resin c-1, 450 parts of ethyl acetate, followed by heating to 80° C. during stirring. The temperature was maintained at 80° C. for 5 hrs, followed by cooling to 30° C. for 1 hr. The resultant mixture was dispersed by a bead mill (ULTRA VISCOMILL, product of AIMEX CO., Ltd.) under the following conditions: a liquid feed rate of 1 kg/hr, disc circumferential velocity of 6 m/s, zirconia beads having a diameter of 0.5 mm packed to 80% by volume, and 3 passes, to thereby obtain [crystalline polyester resin dispersion liquid 1].

<Preparation of Oil Phase>

A vessel was charged with 500 parts of the [WAX dispersion liquid 1], 200 parts of the [prepolymer A-1], 500 parts of the [crystalline polyester resin dispersion liquid 1], 750 parts of the [polyester resin B-1], 100 parts of the [master batch 1], and 2 parts of the [ketimine compound 1] as a curing agent, followed by mixing using a TK Homomixer (product of Tokushu Kika Kogyo Co., Ltd.) at 5,000 rpm for 60 min, to thereby obtain [oil phase 1].

<Synthesis of Organic Fine Particle Emulsion (Particle Dispersion Liquid)>

A reaction vessel equipped with a stirring bar and a thermometer was charged with 683 parts of water, 11 parts of a sodium salt of sulfuric acid ester of methacrylic acid-ethylene oxide adduct (ELEMINOL RS-30, product of Sanyo Chemical Industries, Ltd.), 138 parts of styrene, 138 parts of methacrylic acid, and 1 part of ammonium persulfate, and the resultant mixture was stirred for 15 min at 400 rpm, to thereby obtain a white emulsion. The obtained emulsion was heated to have the system temperature of 75° C., and then was allowed to react for 5 hrs. To the resultant mixture, 30 parts of a 1% ammonium persulfate aqueous solution was added, followed by aging for 5 hrs at 75° C., to thereby obtain an aqueous dispersion liquid of a vinyl resin (a copolymer of styrene/methacrylic acid/sodium salt of sulfuric acid ester of methacrylic acid ethylene oxide adduct), i.e., [particle dispersion liquid 1].

The [particle dispersion liquid 1] was measured by LA-920 (product of HORIBA, Ltd.), and as a result, a volume average particle diameter thereof was found to be 0.14 μm. A part of the [particle dispersion liquid 1] was dried, to thereby isolate a resin content.

<Preparation of Aqueous Phase>

Water (990 parts), 83 parts of the [particle dispersion liquid], 37 parts of a 48.5% aqueous solution of sodium dodecyl diphenyl ether disulfonate (ELEMINOL MON-7, product of Sanyo Chemical Industries Ltd.), and 90 parts of ethyl acetate were mixed and stirred, to thereby obtain an opaque white liquid. The obtained liquid was used as [aqueous phase 1].

<Emulsification • Removal of Solvent>

The [aqueous phase 1] (1,200 parts) was added to a container charged with the [oil phase 1], and the resultant mixture was mixed by a TK Homomixer at 13,000 rpm for 20 min, to thereby obtain [emulsified slurry 1].

A container equipped with a stirrer and a thermometer was charged with the [emulsified slurry 1], followed by removing the solvent therein at 30° C. for 8 hrs. Thereafter, the resultant mixture was aged at 45° C. for 4 hrs, to thereby obtain [dispersion slurry 1].

<Washing • Drying>

After subjecting 100 parts of the [dispersion slurry 1] to filtration under a reduced pressure, the obtained cake was subjected twice to a series of treatments (1) to (4) described below, to thereby produce [filtration cake].

(1): ion-exchanged water (100 parts) was added to the filtration cake, followed by mixing with a TK Homomixer (at 12,000 rpm for 10 min), and then the mixture was filtrated;

(2): one hundred parts of 10% aqueous sodium hydroxide solution was added to the filtration cake obtained in (1), followed by mixing with a TK Homomixer (at 12,000 rpm for 30 min), and then the resultant mixture was filtrated under a reduced pressure;

(3): one hundred parts of 10% by weight hydrochloric acid was added to the filtration cake obtained in (2), followed by mixing with a TK Homomixer (at 12,000 rpm for 10 min) and then the mixture was filtrated; and (4): ion-exchanged water (300 parts) was added to the filtration cake obtained in (3), followed by mixing with a TK Homomixer (at 12,000 rpm for 10 min) and then the mixture was filtrated.

Next, the [filtration cake] was dried with an air-circulating drier at 45° C. for 48 hrs, and then was caused to pass through a sieve with a mesh size of 75 μm, to thereby obtain [toner base particle 1].

A compositional ratio of the [toner base particle 1], and Tg1st, Tg2nd are given in Table 1.

<External Additive Treatment>

One hundred parts of the [toner base particle 1] were mixed with 0.6 parts by weight of the hydrophobic silica having an average particle diameter of 100 nm, 1.0 part by weight of titanium oxide having an average particle diameter of 20 nm, and 0.8 parts by weight of the hydrophobic silica fine powder having an average particle diameter of 15 nm using a Henschel mixer, to thereby obtain a toner of Example 1.

<Preparation of Carrier>

Silicone resin: organostraight silicone (100 parts by weight), 5 parts by weight of γ-(2-aminoethyl)amino propyl trimethoxy silane, and 10 parts by weight of carbon black were added to 100 parts by weight of toluene, the resultant mixture was dispersed by a homomixer for 20 min, to thereby prepare a resin layer coating liquid. The resin layer coating liquid was coated on 1,000 parts by weight of the surfaces of spherical magnetite particles having an average particle diameter of 50 μm, by a fluidized bed coating device, to thereby prepare a carrier.

<Preparation of Developer>

A developer was prepared by mixing 5 parts by weight of the toner 1 with 95 parts by weight of the carrier using a ball mill. Next, each of the prepared developers was evaluated for the following properties. The results are given in Table 1.

<Measurement of Tg1st, Tg2nd, TgA, TgB, T and TgAB>

One (1) g of the toner was placed in 100 mL of THF to be Soxhlet-extracted to extract THF-soluble and insoluble components. These are dried by a vacuum drier for 24 hrs to obtain a THF-insoluble component (polyester resin component A) and a THF-soluble component (polyester resin component B).

Seventeen point five (17.5) parts by weight of the above polyester resin component A and 82.5 parts by weight of the polyester resin component B were melted and mixed at 150° C. to obtain a mixture thereof.

Tg1st and Tg2nd of the toner, and TgA, TgB, T and TgAB of the polyester resin components were measured. An aluminum sample container charged with about 5.0 mg of a sample was placed on a holder unit, and the holder unit was then set in an electric furnace. Next, the sample was heated (first heating) from −80° C. to 150° C. at the heating rate of 10° C./min in a nitrogen atmosphere. Then, the sample was cooled from 150° C. to −80° C. at the cooling rate of 10° C./min, followed by again heating (second heating) to 150° C. at the heating rate of 10° C./min. DSC curves were respectively measured for the first heating and the second heating by a differential scanning calorimeter (Q-200, product of TA Instruments Japan Inc.).

The DSC curve for the first heating was selected from the obtained DSC curve by an analysis program stored in the Q-200 system, to thereby determine a Tg1st of the toner.

Similarly, the DSC curve for the second heating was selected, and Tg2nd of the toner, and TgA, TgB and TgAB with the second heating were be determined. T was determined from the TgA and TgB using the FOX formula.

<Fixable Minimum Temperature and Fixable Maximum Temperature>

An apparatus provided by modifying a fixing portion of IMAGEO MP C5002 (product of Ricoh Company, Ltd.) was used to perform a copy test on sheets of TYPE 6200 (product of Ricoh Company, Ltd.).

Specifically, the cold offset temperature (fixable minimum temperature) and the high temperature offset temperature (fixable maximum temperature) were determined by changing the fixing temperature.

As the evaluation condition of the fixable minimum temperature, the paper-feeding linear velocity was set to 200 mm/sec, the surface pressure was set to 1.0 kgf/cm$^2$, and the nip width was set to 7 mm.

As the evaluation condition of the fixable maximum temperature, the paper-feeding linear velocity was set to 100 mm/sec, the surface pressure was set to 1.0 kgf/cm$^2$, and the nip width was set to 7 mm.

When the fixable minimum temperature is 110° C. or less, the resultant toner obtained in the present invention exhibits a sufficient effect of low-temperature fixability.

When the fixable maximum temperature is 170° C. or more, the resultant toner obtained in the present invention exhibits a sufficient effect of hot offset resistance.

<Heat Resistant Preservability>

The resultant toner was stored at 50° C. for 8 hrs, and was caused to pass through a sieve of 42-mesh for 2 min, to thereby determine a residual rate on a wire mesh. Here, the more excellent the heat resistant preservability of the toner is, the smaller the residual rate is. Note that, the evaluation criteria for heat resistant preservability are as follows.

Excellent: The residual rate is less than 5%.
Good: The residual rate is 5% or more but less than 15%.
Fair: The residual rate is 15% or more but less than 30%.
Poor: The residual rate is 30% or more.

<Charge Quantity of Toner Base Particle (M/M Environment)>

In an environment of 23° C. and 53±3% RH, 0.35 g of the toner base particle and 5 g of the carrier were placed in a cylindrical container formed of SUS having an inner diameter of 25 mm and a height of 30 mm. After the humidity therein was controlled for 12 hrs or more, the container was sealed and rotated at 300 rpm for 5 min. A mixture of the toner and the carrier was sampled from the container and placed in a 400-mesh blowoff cage. After air blown at 5 KPa for 3 min, the charge quantity of the mixture by Q/M meter from EPPING GmbH. The Q/M meter was set at a mesh size of 400 mesh (stainless) and a soft blow pressure (1,050 V) suction time of 90 sec. The charge quantity is determined by the following formula (4):

Charge quantity (µC/g)=total electricity quantity (µC) after 90 sec/suctioned toner quantity (g)   (4)

The charge quantity must not be too high or too low. In the present invention, the charge quantity of a conventional toner base particle (cyan color toner base particle in a digital full-color multifunctional machine Imagio MP C4002) is a criteria.

[Evaluation Criteria]
Excellent: Similar to the conventional toner (reference value: not less than −40 µC/g and less than 30 µC/g)
Good: Slightly low, but usable (not less than −30 µC/g and less than −20 µC/g)
Fair: Low, and difficult to use (not less than −20 µC/g and less than −10 µC/g)
Poor: Too low, and unusable (not less than −10 µC/g)

<Charge Quantity of Toner Base Particle (H/H Environment)>

In an environment of 30° C. and 60±3% RH, 0.35 g of the toner base particle and 5 g of the carrier were placed in a cylindrical container formed of SUS having an inner diameter of 25 mm and a height of 30 mm. After the humidity therein was controlled for 1, the humidity was increased to 90±3% RH (H/H environment) in 2 hrs. After the humidity was kept for 3 hrs, the container was sealed and rotated at 300 rpm for 5 min. A mixture of the toner and the carrier was sampled from the container and placed in a 400-mesh blowoff cage. After air blown at 5 KPa for 3 min, the charge quantity of the mixture by Q/M meter from EPPING GmbH. The Q/M meter was set at a mesh size of 400 mesh (stainless) and a soft blow pressure (1,050 V) suction time of 90 sec. The charge quantity is determined by the following formula (4):

Charge quantity (µC/g)=total electricity quantity (µC) after 90 sec/suctioned toner quantity (g)   (4)

The charge quantity must not be too high or too low. In the present invention, the charge quantity of a conventional toner base particle (cyan color toner base particle in a digital full-color multifunctional machine Imagio MP C4002) is a criteria.

[Evaluation Criteria]
Excellent: Higher than the conventional toner (reference value: less than −25 µC/g
Good: Similar to the conventional toner (not less than −25 µC/g and less than −15 µC/g)
Fair: Low, and difficult to use (not less than −15 µC/g and less than −10 µC/g)
Poor: Too low, and unusable (not less than −10 µC/g)

<Charge Quantity Variation Rate of Toner>

The above procedure for measuring the charge quantity was repeated except for using the toner instead of the toner base particle and rotating the container for 60 min. The charge quantity after the lapse of 5 min from the start of rotating was Q5 and the charge quantity after the lapse of 60 min from the start of rotating was Q60, and the charge quantity variation rate was determined by the following formula (5):

The lower the charge quantity variation rate, the higher the charge stability even when the toner deteriorates due to mechanical stress.

$$\text{The charge quantity variation rate (\%)} = (|Q5-Q60|/Q5) \times 100 \quad (5)$$

[Evaluation Criteria]
Excellent: The charge quantity variation is Less than 10%
Good: The charge quantity variation is not less than 10% and less than 20%
Average: The charge quantity variation is not less than 20% and less than 35%
Fair: The charge quantity variation is not less than 35% and less than 55%
Poor: The charge quantity variation is not less than 55%

<Charge Distribution Stability of Toner>

The developer was filled in an image forming apparatus Ricoh pro 6001 from Ricoh Company, Ltd., 5,000 pieces of an image chart having an image areal ratio of 5% were produced on A4 My Recycle Paper from NBS Ricoh Co., Ltd. in an A4 longitudinal direction at a cycle of 5 pieces/job.

Next, the developer was sampled, and a number distribution of a ratio of the charge quantity (Q) to the particle diameter (d) (Q/d) (fC/µm) was measured by a charge quantity distribution measurer E-SPART ANALYZER from Hosokawa Micron Corp. to determine a ratio (W) (%) of the count number not less than −1 fC/µm to the total count number. The measuring conditions of the E-SPART ANALYZER included a nitrogen gas flow amount of 0.3 NL/min, a gas pressure of 0.3 atmospheres and a count number not less than 3,000.

The less the ratio (W), the higher the robustness of the developer against stress and toner supply in the developing device. A ratio of the reverse-charged (positively charged) or low-charged particles is low.

[Evaluation Criteria]
Excellent: The ratio W is less than 3%
Good: The ratio W is not less than 3% and less than 10%
Average: The ratio W is not less than 10% and less than 20%
Fair: The ratio W is not less than 20% and less than 40%
Poor: The ratio W is not less than 40%

Example 2

The procedure and evaluation of the toner 1 in Example 1 were repeated except for replacing the amorphous polyester resin b-1 with the amorphous polyester resin b-2. The results are given in Table 1.

Example 3

The procedure and evaluation of the toner 1 in Example 1 were repeated except for replacing the prepolymer a-1 with the prepolymer a-2. The results are given in Table 1.

Example 4

The procedure and evaluation of the toner 1 in Example 1 were repeated except for replacing the prepolymer a-1 with the prepolymer a-3. The results are given in Table 1.

Example 5

The procedure and evaluation of the toner 1 in Example 1 were repeated except for replacing the amorphous polyester resin b-1 with the amorphous polyester resin b-3. The results are given in Table 1.

Example 6

The procedure and evaluation of the toner 1 in Example 1 were repeated except for replacing the prepolymer a-1 with the prepolymer a-5 and changing the parts by weight of the prepolymer a-5 and the polyester resin b-1 in <Preparation of Oil Phase> into 300 parts and 700 parts, respectively. The results are given in Table 1.

Example 7

The procedure and evaluation of the toner 1 in Example 1 were repeated except for changing the parts by weight of the crystalline polyester resin dispersion liquid 1 and the polyester resin b-1 into 0 part and 800 parts, respectively.

Comparative Example 1

The procedure and evaluation of the toner 1 in Example 1 were repeated except for replacing the prepolymer a-1 and the amorphous polyester resin B-1 with the prepolymer a-4 and the amorphous polyester resin B-2, respectively.

Comparative Example 1

The procedure and evaluation of the toner 1 in Example 1 were repeated except for changing the parts by weight of the prepolymer a-1 and the polyester resin b-1 in <Preparation of Oil Phase> from 200 into 0 part and from 750 into 850 parts, respectively. The results are given in Table 1.

TABLE 1

| | | Example 1 | Example 2 | Example 3 |
|---|---|---|---|---|
| Amorphous Polyester Resin a | Name | a-1 | a-1 | a-2 |
| | Mw | 45,000 | 45,000 | 60,000 |
| | Mn | 7,000 | 7,000 | 10,000 |
| | Tg (° C.) | −25° C. | −25° C. | −20° C. |
| Amorphous Polyester Resin b | Name | b-1 | b-2 | b-1 |
| | Mw | 10,000 | 10,000 | 10,000 |
| | Mn | 4,000 | 3,500 | 4,000 |
| | Tg (° C.) | 60° C. | 60° C. | 60° C. |
| Crystalline Polyester Resin c | Name | c-1 | c-1 | c-1 |
| | Mw | 15,000 | 15,000 | 15,000 |
| | Mn | 5,000 | 5,000 | 5,000 |
| | Tg (° C.) | 75° C. | 75° C. | 75° C. |
| Toner Resin Constitutional Ratio (% by weight) | Resin A | 10 | 10 | 10 |
| | Resin B | 75 | 75 | 75 |
| | Resin C | 5 | 5 | 5 |
| | Release Agent | 5 | 5 | 5 |
| | Colorant | 5 | 5 | 5 |
| Evaluation of Physical Properties | Toner Tg1st (° C.) | 40 | 41 | 41 |
| | Toner Tg2nd (° C.) | 20 | 22 | 24 |
| | TgA (° C.) | −25 | −25 | −20 |
| | TgB (° C.) | 40 | 40 | 40 |
| | T (° C.) | 26 | 26 | 28 |
| | TgAB (° C.) | 16 | 18 | 22 |
| | T − TgAB (° C.) | 10 | 8 | 6 |
| | MwA | 50,000 | 50,000 | 65,000 |
| | MnA | 8,000 | 8,000 | 10,000 |
| | MwB | 12,000 | 12,000 | 12,000 |
| | MnB | 4,500 | 4,000 | 4,500 |
| | MwA − MwB | 38,000 | 38,000 | 53,000 |
| | MnA − MnB | 3,500 | 4,000 | 5,500 |
| Quality Evaluation | Fixable Minimum Temperature (° C.) | 100 | 105 | 105 |
| | Fixable Maximum Temperature (° C.) | 190 | 185 | 180 |
| | Heat Resistant Preservability | Excellent | Excellent | Good |
| | Toner Base Charge Quantity (M/M) | Excellent | Excellent | Good |
| | Toner Base Charge Quantity (H/H) | Excellent | Good | Good |
| | Charge Quantity Variation Rate | Excellent | Excellent | Good |
| | Charge Distribution Stability | Excellent | Good | Good |

| | | Example 4 | Example 5 | Example 6 |
|---|---|---|---|---|
| Amorphous Polyester Resin a | Name | a-3 | a-1 | a-5 |
| | Mw | 40,000 | 45,000 | 48,000 |
| | Mn | 6,000 | 7,000 | 8,000 |
| | Tg (° C.) | −25° C. | −25° C. | −40° C. |
| Amorphous Polyester Resin b | Name | b-1 | b-3 | b-1 |
| | Mw | 10,000 | 12,000 | 10,000 |
| | Mn | 4,000 | 4,800 | 4,000 |
| | Tg (° C.) | 60° C. | 69° C. | 60° C. |
| Crystalline Polyester Resin c | Name | c-1 | c-1 | c-1 |
| | Mw | 15,000 | 15,000 | 15,000 |
| | Mn | 5,000 | 5,000 | 5,000 |
| | Tg (° C.) | 75° C. | 75° C. | 75° C. |
| Toner Resin Constitutional Ratio (% by weight) | Resin A | 10 | 10 | 15 |
| | Resin B | 75 | 75 | 70 |
| | Resin C | 5 | 5 | 5 |
| | Release Agent | 5 | 5 | 5 |
| | Colorant | 5 | 5 | 5 |
| Evaluation of Physical Properties | Toner Tg1st (° C.) | 41 | 49 | 22 |
| | Toner Tg2nd (° C.) | 23 | 29 | 5 |
| | TgA (° C.) | −25 | −25 | −40 |
| | TgB (° C.) | 40 | 50 | 40 |
| | T (° C.) | 26 | 34 | 22 |
| | TgAB (° C.) | 19 | 24 | 12 |
| | T − TgAB (° C.) | 7 | 10 | 10 |
| | MwA | 50,000 | 50,000 | 55,000 |
| | MnA | 8,000 | 8,000 | 9,000 |
| | MwB | 12,000 | 13,000 | 12,000 |
| | MnB | 4,500 | 5,000 | 4,500 |
| | MwA − MwB | 38,000 | 37,000 | 43,000 |
| | MnA − MnB | 3,500 | 3,000 | 4,500 |
| Quality Evaluation | Fixable Minimum Temperature (° C.) | 105 | 110 | 95 |
| | Fixable Maximum Temperature (° C.) | 180 | 190 | 180 |
| | Heat Resistant Preservability | Good | Excellent | Good |
| | Toner Base Charge Quantity (M/M) | Excellent | Excellent | Excellent |
| | Toner Base Charge Quantity (H/H) | Good | Excellent | Good |
| | Charge Quantity Variation Rate | Excellent | Excellent | Excellent |
| | Charge Distribution Stability | Good | Excellent | Good |

TABLE 1-continued

|  |  | Example 7 | Comparative Example 1 | Comparative Example 2 |
|---|---|---|---|---|
| Amorphous Polyester Resin a | Name | a-1 | a-4 | — |
|  | Mw | 45,000 | 150,000 | — |
|  | Mn | 7,000 | 15,000 | — |
|  | Tg (° C.) | −25° C. | −40° C. | — |
| Amorphous Polyester Resin b | Name | b-1 | b-2 | b-1 |
|  | Mw | 10,000 | 10,000 | 10,000 |
|  | Mn | 4,000 | 3,500 | 4,000 |
|  | Tg (° C.) | 60° C. | 60° C. | 60° C. |
| Crystalline Polyester Resin c | Name | — | c-1 | c-1 |
|  | Mw | — | 15,000 | 15,000 |
|  | Mn | — | 5,000 | 5,000 |
|  | Tg (° C.) | — | 75° C. | 75° C. |
| Toner Resin Constitutional Ratio (% by weight) | Resin A | 10 | 10 | 0 |
|  | Resin B | 80 | 75 | 85 |
|  | Resin C | 0 | 5 | 5 |
|  | Release Agent | 5 | 5 | 5 |
|  | Colorant | 5 | 5 | 5 |
| Evaluation of Physical Properties | Toner Tg1st (° C.) | 40 | 34 | 58 |
|  | Toner Tg2nd (° C.) | 38 | 24 | 40 |
|  | TgA (° C.) | −25 | −40 | — |
|  | TgB (° C.) | 60 | 40 | 40 |
|  | T (° C.) | 41 | 22 | — |
|  | TgAB (° C.) | 31 | 20 | — |
|  | T − TgAB (° C.) | 10 | 2 | — |
|  | MwA | 50,000 | 160,000 | — |
|  | MnA | 8,000 | 18,000 | — |
|  | MwB | 12,000 | 12,000 | 12,000 |
|  | MnB | 4,500 | 4,500 | 4,500 |
|  | MwA − MwB | 38,000 | 148,000 | — |
|  | MnA − MnB | 3,500 | 13,500 | — |
| Quality Evaluation | Fixable Minimum Temperature (° C.) | 110 | 115 | 140 |
|  | Fixable Maximum Temperature (° C.) | 190 | 165 | 160 |
|  | Heat Resistant Preservability | Excellent | Fair | Excellent |
|  | Toner Base Charge Quantity (M/M) | Excellent | Fair | Excellent |
|  | Toner Base Charge Quantity (H/H) | Excellent | Poor | Good |
|  | Charge Quantity Variation Rate | Excellent | Fair | Excellent |
|  | Charge Distribution Stability | Excellent | Poor | Good |

Having now fully described the invention, it will be apparent to one of ordinary skill in the art that many changes and modifications can be made thereto without departing from the spirit and scope of the invention as set forth therein.

What is claimed is:

1. A toner comprising a polyester resin, the polyester resin including;
    a polyester resin component A insoluble in tetrahydrofuran; and
    a polyester resin component B soluble in tetrahydrofuran,
    wherein the toner has a first glass transition temperature (Tg1st) of from 20° C. to 50° C., measured at a first temperature rising in differential scanning calorimetry (DSC), and satisfies the following formulae (1) and (2):

$$T = 1/\{a/(TgA+273) + b/(TgB+273)\} - 273 \quad (1)$$

$$T - TgAB > 30 \times a \quad (2)$$

wherein a and b represent weight ratios of the polyester resin component A and the polyester resin component B to a total weight of the polyester resin component A and the polyester resin component B, and satisfy the equation a+b=1; and TgA, TgB and TgAB represent second glass transition temperatures (Tg2nd), measured at a second temperature rising in differential scanning calorimetry, of the polyester resin component A, the polyester resin component B, and a mixture of the polyester resin component A and the polyester resin component B, respectively.

2. The toner of claim 1, wherein the polyester resin component A comprises a trivalent or tetravalent aliphatic alcohol component having 3 to 10 carbon atoms as a polyol component.

3. The toner of claim 1, wherein the polyester resin component A includes a diol component, the diol component having a main chain having an odd number of carbon atoms, and the diol component having a side chain having an alkyl group.

4. The toner of claim 1, wherein the polyester resin component A comprises at least one of urethane bond and urea bond.

5. The toner of claim 1, wherein the polyester resin component B comprises a trivalent or tetravalent aliphatic alcohol component having 3 to 10 carbon atoms as a polyol component.

6. The toner of claim 1, wherein a difference in weight-average molecular weight between the polyester resin component A and the polyester resin component B is 50,000 or less, and a difference in number-average molecular weight between the polyester resin component A and the polyester resin component B is 5,000 or less.

7. The toner of claim 1, wherein the component A comprises a dicarboxylic acid component as a polycarboxylic acid component, and the dicarboxylic acid component comprises an aliphatic dicarboxylic acid having 4 to 12 carbon atoms.

8. The toner of claim 1, wherein the toner has a second glass transition temperature (Tg2nd) of from 0° C. to 30° C., measured at a second temperature rising in differential scanning calorimetry, and satisfies the following relation:

$$Tg1st - Tg2nd > 10° C.$$

9. A developer comprising the toner according to claim 1.

10. An image forming apparatus, comprising:
    an electrostatic latent image bearer;
    an electrostatic latent image former to form an electrostatic latent image on the electrostatic latent image bearer; and
    an image developer to develop the electrostatic latent image with the toner according to claim 1 to form a toner image.

11. A process cartridge detachably mountable on image forming apparatus, comprising:
    an electrostatic latent image bearer; and
    an image developer to develop an electrostatic latent image formed on an electrostatic latent image bearer with the toner according to claim 1 to form a toner image.

* * * * *